United States Patent
Cash

(10) Patent No.: US 11,176,554 B2
(45) Date of Patent: Nov. 16, 2021

(54) VALIDATION IDENTITY TOKENS FOR TRANSACTIONS

(71) Applicant: Visa International Service Association, San Francisco, CA (US)

(72) Inventor: Duane Cash, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 789 days.

(21) Appl. No.: 15/013,825

(22) Filed: Feb. 2, 2016

(65) Prior Publication Data

US 2016/0224983 A1 Aug. 4, 2016

Related U.S. Application Data

(60) Provisional application No. 62/111,520, filed on Feb. 3, 2015.

(51) Int. Cl.
*G06Q 20/38* (2012.01)
*G06Q 20/40* (2012.01)
*H04L 29/06* (2006.01)

(52) U.S. Cl.
CPC ..... *G06Q 20/40145* (2013.01); *G06Q 20/385* (2013.01); *G06Q 20/3829* (2013.01);
(Continued)

(58) Field of Classification Search
CPC ....... H04L 9/28; H04L 63/08; H04L 63/0861; H04K 1/187; G06Q 20/325;
(Continued)

(56) References Cited

U.S. PATENT DOCUMENTS 5,613,012 A 3/1997 Hoffman
5,781,438 A 7/1998 Lee
(Continued)

FOREIGN PATENT DOCUMENTS

EP 2156397 A1 2/2010
WO 2001035304 A1 5/2001
(Continued)

OTHER PUBLICATIONS

International Application No. PCT/US2016/016208, International Search Report, dated May 27, 2016, 11 pages (1248WO01).
(Continued)

*Primary Examiner* — John W Hayes
*Assistant Examiner* — Nakia Leffall-Allen
(74) *Attorney, Agent, or Firm* — Kilpatrick Townsend & Stockton LLP

(57) ABSTRACT

A user initiates a transaction by providing identification data at an access device. Certain elements of a validation identity token, such validation keys, may be distributed among several remote server computers. After the elements are retrieved during the transaction, the validation identity token may be generated using the retrieved elements. The validation identity token may indicate whether the user is authenticated. No single entity can possess all elements utilized to generate the validation identity token, which mitigates risk of the validation identity token being compromised. In some embodiments, the validation identity token may be a chromatic identity token, which may indicate validity by color.

19 Claims, 9 Drawing Sheets

(52) U.S. Cl.
CPC ......... *G06Q 20/4016* (2013.01); *H04L 63/08* (2013.01); *H04L 63/0807* (2013.01); *H04L 63/0861* (2013.01)

(58) Field of Classification Search
CPC ............. G06Q 20/3674; G06Q 20/385; G06Q 20/3829; G06Q 20/40; G06Q 20/40145; G06Q 20/4016; G06K 9/00; G06K 9/00221–00389; G06T 2207/30196–30201; H04N 5/23219; H04N 21/4223; H04N 21/44218; G06F 17/30793; A61B 5/1176
See application file for complete search history.

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,118,874 A * | 9/2000 | Okamoto | H04L 9/0894 380/282 |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,922,082 B2 | 4/2011 | Muscato | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,171,525 B1 | 5/2012 | Pelly | |
| 8,196,813 B2 | 6/2012 | Vadhri | |
| 8,205,791 B2 | 6/2012 | Randazza | |
| 8,224,702 B2 | 7/2012 | Mengerink | |
| 8,225,385 B2 | 7/2012 | Chow | |
| 8,265,993 B2 | 9/2012 | Chien | |
| 8,280,777 B2 | 10/2012 | Mengerink | |
| 8,328,095 B2 | 12/2012 | Oder, II | |
| 8,376,225 B1 | 2/2013 | Hopkins, III | |
| 8,380,177 B2 | 2/2013 | Laracey | |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,478 B2 | 8/2013 | Saunders | |
| 8,510,816 B2 | 8/2013 | Quach | |
| 8,533,860 B1 | 9/2013 | Grecia | |
| 8,538,845 B2 | 9/2013 | Liberty | |
| 8,555,079 B2 | 10/2013 | Shablygin | |
| 8,566,168 B1 | 10/2013 | Bierbaum | |

(56) References Cited

U.S. PATENT DOCUMENTS

| | | |
|---|---|---|
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,887,308 B2 | 11/2014 | Grecia |
| 2001/0029485 A1 | 10/2001 | Brody |
| 2001/0034720 A1 | 10/2001 | Armes |
| 2001/0054003 A1 | 12/2001 | Chien |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0117638 A1* | 6/2004 | Monroe ............... G07C 9/38 713/186 |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0256961 A1 | 11/2006 | Brainard et al. |
| 2006/0278704 A1 | 12/2006 | Saunders |
| 2006/0291001 A1* | 12/2006 | Sung ............... G06K 9/00281 358/453 |
| 2007/0101126 A1 | 5/2007 | Choi et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0065901 A1 | 3/2008 | Takaku et al. |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0289020 A1 | 11/2008 | Cameron |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0034725 A1* | 2/2009 | Davies, Sr. ............ H04L 63/08 380/255 |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0174914 A1* | 7/2010 | Shafir ............... G06K 9/00268 713/186 |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0123071 A1* | 5/2011 | Shah ............... G06K 9/00302 382/118 |
| 2011/0125597 A1 | 5/2011 | Oder, II |
| 2011/0153437 A1 | 6/2011 | Archer |
| 2011/0154466 A1 | 6/2011 | Harper |
| 2011/0161233 A1 | 6/2011 | Tieken |
| 2011/0191244 A1 | 8/2011 | Dai |
| 2011/0238511 A1 | 9/2011 | Park |

(56) References Cited

U.S. PATENT DOCUMENTS

| | | |
|---|---|---|
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1* | 1/2012 | Hammad ........... G06Q 20/4016 726/9 |
| 2012/0028609 A1 | 2/2012 | Hruska |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1* | 5/2012 | Hammad ................ G06F 21/34 705/67 |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1* | 2/2014 | Jooste ................. G06Q 20/325 705/44 |
| 2014/0067679 A1* | 3/2014 | O'Reilly .......... G06Q 20/40145 705/44 |
| 2014/0100973 A1* | 4/2014 | Brown ............... G06Q 20/3274 705/17 |
| 2014/0101453 A1 | 4/2014 | Senthurpandi |
| 2014/0136419 A1* | 5/2014 | Kiyohara ........... G06Q 20/3221 705/67 |
| 2014/0222596 A1 | 8/2014 | Prakash |
| 2014/0294175 A1* | 10/2014 | Boloker ................. H04L 9/3247 380/30 |
| 2014/0365373 A1* | 12/2014 | Pelegero ................ G06Q 20/12 705/44 |
| 2015/0032625 A1 | 1/2015 | Dill |

(56) References Cited

U.S. PATENT DOCUMENTS

2015/0032626 A1   1/2015 Dill
2015/0032627 A1   1/2015 Dill
2015/0046338 A1   2/2015 Laxminarayanan

FOREIGN PATENT DOCUMENTS

| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

\* cited by examiner

VALIDATION IDENTITY TOKENS FOR TRANSACTIONS

CROSS-REFERENCES TO RELATED APPLICATIONS

This application is a non-provisional of and claims the benefit of priority to U.S. Provisional Application No. 62/111,520, filed Feb. 3, 2015, which is hereby incorporated by reference in its entirety for all purposes.

BACKGROUND

Conventional tokenization processes could be improved. While typical tokenization processes can utilize tokens to hide sensitive information of user during transaction, they can have vulnerabilities. For example, a token may be transmitted to several entities involved in a transaction process allowing the token to be stolen at any point during the transaction (e.g., intercepted by a man-in-the-middle), and in their final form. Upon retrieving the token, a malicious party can carry out a fraudulent transaction. In some cases, a token can be dynamically generated at the time of a transaction to reduce risk. However, such dynamic tokens are still at risk of being stolen.

Additionally, conventional payment tokenization processes could be more efficient. For example, a user conducting a transaction may still need to present a payment device (e.g., payment card, etc.) during a transaction. This can be cumbersome as the user has to take out their payment device and conduct extra actions (e.g., swipe, dip, touch, etc.) during the transaction. Further, the user may be required to provide manual input, such as a physical signature, for verification during the transaction. These extra steps can be time-consuming and inefficient. Thus, the use of tokens in typical payment tokenization processes does not provide sufficient security and efficiency.

Embodiments of the invention address these and other problems, individually and collectively.

BRIEF SUMMARY

Embodiments of the invention are related to systems and methods for enabling tokenization processes that increase security and efficiency of transactions. Embodiments of the invention enable transactions that reduce the vulnerability of tokens to being stolen and utilized by a fraudulent party. In embodiments of the invention, several pieces of information that may be utilized to generate a token can be distributed to multiple entities, such that no single entity stores all information utilized to generate the token. This mitigates the risk of a whole token being intercepted by an intermediary, which reduces the risk of fraudulent transactions. Additionally, these transactions can be conducted without the use of a payment device. Thus, embodiments of the invention enable transactions that have increased security and efficiency.

One embodiment of the invention is a method. The method may comprise generating a request message comprising identification data of the user. The method may further comprise transmitting the request message comprising the identification data to a plurality of remote server computers including an authorization computer. The server computers may respectively comprise validation keys that are used to form at least part of a validation identity token. The method may also comprise receiving a response message comprising the validation keys from the authorization computer and generating the validation identity token using at least the validation keys. In some cases, the validation identity token is formed using the validation keys and a validation identity token precursor.

Further, the method may comprise authenticating the user based upon the generated validation identity token. In some embodiments, authenticating may comprise comparing the generated validation identity token with another validation identity token previously provided by the user, determining a value associated with the difference between the generated validation identity token and the validation identity token previously provided by the user, and determining that the value is within a threshold.

In some embodiments, the identification data may be of different forms. For example, in some cases, the identification data may comprise the validation identity token precursor. In some cases, the identification data may comprise biometric data. In some cases, the identification data may comprise an account identifier. In some embodiments, the validation keys are chromatic keys and the validation identity token is a chromatic identity token. In some cases, the validation identity token precursor is a chromatic identity token precursor.

Another embodiment of the invention is an access device. The access device may comprise a process and a computer-readable medium coupled to the processor, the computer-readable medium comprising code, executable by the processor, for performing the above-described method.

Another embodiment of the invention is a method. The method may comprise receiving a request message comprising identification data of a user and retrieving a validation key, wherein the validation key is used to form at least part of a validation identity token. The method may further comprise including the validation key in the request message and sending the request message to one or more remote server computers including an authorization computer. The one or more remote server computers may respectively comprise validation keys that are used to form at least part of the validation identity token. The method may further comprise receiving a response message including the validation keys in the request message and sending the response message to an access device, wherein the user is authenticated based upon the validation identity token.

Another embodiment of the invention is a server computer. The server computer may comprise a processor and a computer-readable medium coupled to the processor, the computer-readable medium comprising code, executable by the processor, for performing the above described method.

These and other embodiments of the invention are described in further detail below.

DETAILED DESCRIPTION

Figure 1:
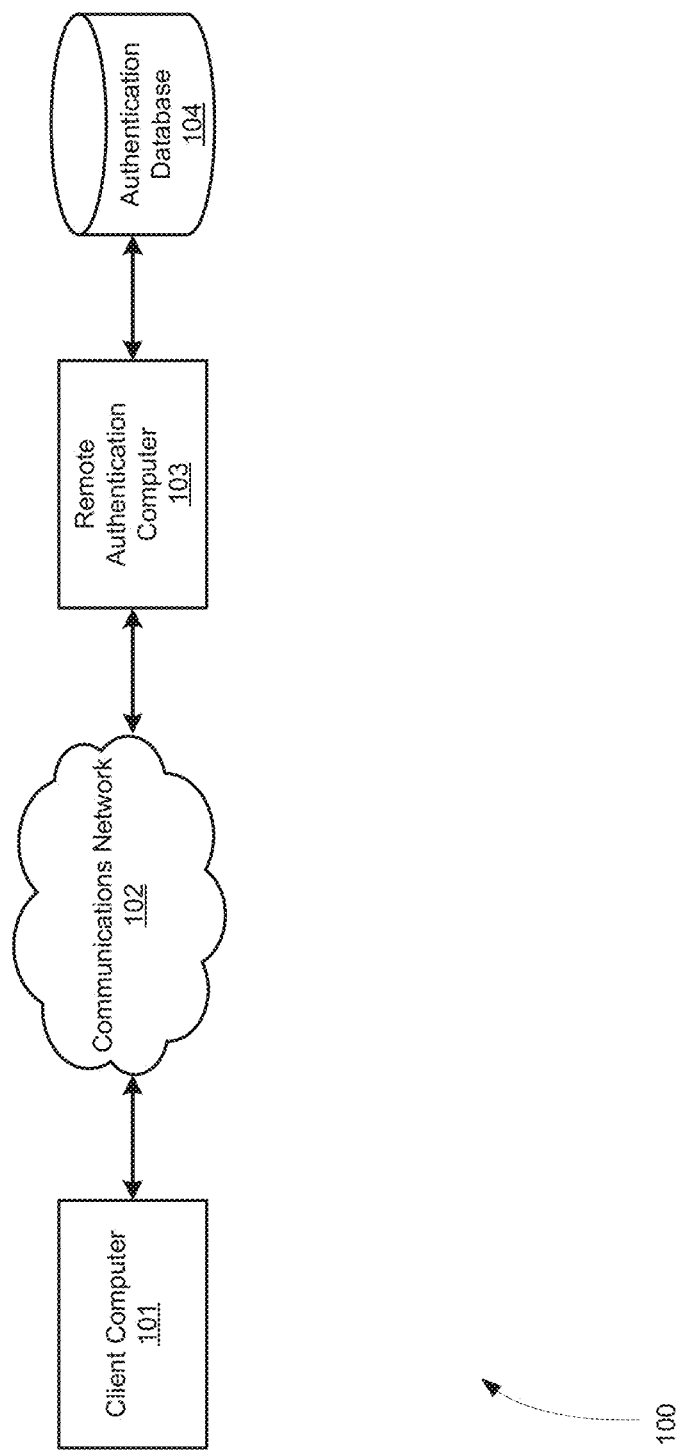
FIG. 1 shows a block diagram of a prior system according to embodiments of the invention.

Embodiments of the invention are related to systems and methods for enabling tokenization processes that mitigate the risk of tokens being compromised. Certain elements utilized to generate a token may be dispersed to multiple entities (e.g., remote server computers) such that no single entity stores all the elements utilized to generate the token. Each distributed element may be used to form at least part of the token. Upon collection of all the distributed elements, the token be completed and utilized to authenticate a user conducting a transaction.

Conventional systems include tokenization processes that are vulnerable to fraud. For example, conventional systems may transmit a token to multiple entities involved in the transaction process. This presents the risk the token be stolen by an intermediary at any point during the transaction.

Embodiments of the invention provide direct benefits, such as increased security and transaction efficiency. Forgoing transmission of a whole token during a transaction can reduce risk of fraud, since it cannot be obtained by a man-in-the-middle. In embodiments of the invention, information that may be utilized to generate the token may be distributed to several entities. Consequently, the risk of that the entire token will be stolen by an intermediary is reduced. Additionally, some embodiments of the invention enable conducting transactions that are convenient and simple, such as by not requiring a device (e.g., payment device) and physical signature to be provided by a user. Thus, typical cumbersome processes associated with conducting transactions may be eliminated without compromising security of the transactions.

Prior to discussing embodiments of the invention, description of some terms may be helpful in understanding embodiments of the invention.

"Identification data" may be any information that can be utilized to identify a user. Some examples of identification data may include biometric information. The biometric information may be in any suitable form, such as facial images, facial recognition data (e.g., digital 3D models, topographic maps, etc.), iris scans, voice prints, voice samples, fingerprint data, and other information. Other examples of identification data may include a name, a driver's license number, a birth date, an account number (e.g., personal account number (PAN)), a card verification value (CVV), an account number expiration date, and other information associated with the user. In some embodiments, identification data may comprise a validation identity token precursor.

A "validation identity token" may be data that indicates that an entity is authentic and valid. In some embodiments, the validation identity token may comprise digital data that may be used to validate a transaction. A validation identity token may be in any suitable form including a numerical value, a color, an image, a picture, etc. In some embodiments, the validation identity token may be generated using at least a plurality of validation keys. In some embodiments, the validation identity token may be generated using the plurality of validation keys and a validation identity token precursor.

A "validation identity token precursor" may be data that can be used to create a validation entity token. The validation identity token precursor may be unique to a user and may be utilized to identify the user. In some cases, the validation identity token precursor may be generated using identification data associated with the user. In an exemplary case, the validation identity token precursor may be a trigonometric identity value generated based on a facial image of the user.

A "validation key" may include data which, in combination with a validation identity token precursor or other validation keys, may form a validation identity token. In some cases, the validation key may be a numerical value. The validation key may be of a different value that the validation identity token precursor and may be stored at a remote server computer. In some implementations, the validation key may be generated based on a portion of identification data associated with a user. In an exemplary case, a validation key may be generated based on a certain portion of a facial image of the user. For example, the validation key may be digital image data corresponding to the portion of the image, a numerical representation of a physical position on the face in the portion of the image, or a numerical representation of a combination (e.g., summation, average, etc.) of multiple physical positions on the face in the portion of the image.

A "chromatic identity token" may be a validation identity token that can be represented by color. The chromatic identity token may be associated with a color indicating whether a user may be authenticated for a transaction. In some embodiments, the chromatic identity token may be a numerical value associated with a color, such as a 24-bit color representation in the RGB color space (e.g., hexadecimal value #00FF00). However, any suitable representation may be utilized. The chromatic identity token may be generated utilizing at least chromatic keys. In some cases, the chromatic identity token may be generated also utilizing a chromatic identity token precursor.

A "chromatic identity token precursor" may be a validation identity token precursor that can be represented by a color. In some embodiments, the chromatic identity token precursor may be a numerical value associated with a color, such as a 24-bit color representation in the RGB color space. However, any suitable representation may be utilized. The chromatic identity token precursor may be unique to a user and in some cases, may be utilized to identity a user. The chromatic identity token precursor may be generated based on identification data of a user. In an exemplary case, the chromatic identify token precursor may be a numerical value associated with a color mapped from a trigonometric identity value generated based on a facial image of the user.

A "chromatic key" may be a validation key that can be represented by a color. In some embodiments, the chromatic key may be numerical value associated with a color, such as a 24-bit color representation in the RGB color space. However, any suitable representation may be utilized. The validation key may be of a different value that of the chromatic identity token precursor and may be stored at a remote server computer. The chromatic key may be generated based on identification data of a user.

An "account identifier" may be any information that may be associated with a user's account. In some embodiments, the account identifier may be a personal account number (PAN), an email address, a name, a driver's license number, or other identifier. The account identifier may be any suitable identifier that may be associated with the user and may be utilized to identity an account of the user.

A "request message" may be any suitable message that includes information associated with a request. In some embodiments, the request message may be sent during a transaction from an access device and may include a request to authenticate a user for a transaction and/or may seek approval for a transaction. In the latter case, a "request message" may be an "authorization request message." In some cases, the request message may comprise identification data of the user. In some embodiments, the request message may also include instructions to server computers that handle the request message to retrieve validation keys. The request message may or may not include a validation identity token precursor.

A "server computer" may typically be a powerful computer or cluster of computers. For example, the server computer can be a large mainframe, a minicomputer cluster, or a group of servers functioning as a unit. A server computer may be associated with an entity such as a processing network, a resource provider computer, a transport computer, or an authorization computer.

An "authorization request message" may be an electronic message that requests authorization. For example, the authorization request message may be sent to a processing network (e.g., payment processing network) and/or an authorization computer (e.g., issuer) of a payment card to request authorization for a transaction. An authorization request message according to some embodiments may comply with (International Organization of Standardization) ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, and the like. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply that indicates authorization status. For example, the authorization response message may be a reply to an authorization request message generated by an issuing financial institution or a processing network (e.g., payment processing network). The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network) to the access device (e.g. POS equipment), associated with a resource provider computer (e.g., merchant) that indicates approval of the transaction. The code may serve as proof of authorization. As noted above, in some embodiments, a processing network may generate or forward the authorization response message to the resource provider computer (e.g., merchant computer).

A "resource providing entity" may be an entity that may make resources available to a user. A resource providing entity may also be known as a resource provider. Examples of resource providing entities include merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, buildings, etc.) and online platforms (e.g., e-commerce websites, online companies, etc.). At the physical locations, the resource providing entity may host an access device for conducting transactions with a user's payment device. In some embodiments, resource providing entities may make available physical items (e.g., goods, products, etc.) to the user. In other embodiments, resource providing entities may make available digital resources (e.g., electronic documents, electronic files, etc.) or services to the user. In other embodiments, resource providing entities may manage access to certain resources by the user.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. The acquirer may operate an acquirer computer, which can also be generically referred to as a "transport computer."

A "payment processing network" may include data processing subsystems, networks, and operations used to support and deliver authorization services, and clearing and settlement services. For example, the payment processing network may comprise a server computer, coupled to a network interface, and a database of information. The payment processing network may include wired or wireless network, including the internet. An exemplary payment processing network includes VisaNet®, operated by Visa®. Payment processing networks such as VisaNet™ are able to process credit card transactions, debit card transactions, and other types of commercial transactions. VisaNet™, in particular, includes a VIP system (Visa Integrated Payments system), which processes authorization requests and a Base II system which performs clearing and settlement services. The payment processing network may also be generically referred to as a "processing network."

An "authorizing entity" may be an entity that authorizes a request. Examples of an authorizing entity may be an issuer, a governmental agency, a document repository, an access administrator, etc. An authorizing entity may be associated with an authorization computer.

An "issuer" may typically refer to a business entity (e.g., a bank) that maintains an account for a user. An issuer may also issue payment (credit/debit) card, account numbers or payment tokens stored on a user device, such as a cellular telephone, smart card, tablet, or laptop to the user. Some issuer systems can perform both issuer computer and acquirer computer functions. When a transaction involves a payment account associated with the issuer, the issuer may verify the account and respond with an authorization response message to the acquirer that may be forwarded to the corresponding access device, if applicable.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, a server computing device, and any computer may be exemplary types of computing devices.

Embodiments of the invention provide several advantages over conventional systems and methods for performing tokenization processes for transactions. A prior system is shown in FIG. 1.

FIG. 1 shows a block diagram 100 of a prior system according to embodiments of the invention. FIG. 1 includes a client computer 101, a communications network 102, a remote authentication computer 103, and an authentication database 104. Client computer 101 and remote authentication computer 103 may be in communication by communications network 102.

A transaction may be conducted between client computer 101 and remote authentication computer 103. Upon receiving a transaction request message from client computer 101, remote authentication computer 103 may initiate an authentication process to verify a user associated with client computer 101. In some cases, the transaction request message may include an authentication token. Remote authentication computer 103 may communicate with authentication database 104 to retrieve authentication information associated with the authentication token. Remote authentication computer 103 may then verify the user based on the authentication information and then complete the transaction.

While the typical system shown in FIG. 1 utilizes tokenization processes for conducting a transaction, it presents several disadvantages. For example, the authentication token utilized for the transaction is transmitted in its whole form between remote computers (e.g., client computer 101 and remote authentication computer 103). This increases the risk of fraud because the authentication token can be stolen by an intermediary while it is being transmitted over communications network 102 and utilized to conduct a fraudulent transaction. While not shown in FIG. 1, several more entities may exist between client computer 101 and remote authentication computer 103, which can even further increase the chances of the authentication token being comprised. Thus, any transmission of the authentication token can put the transaction in jeopardy.

In contrast, embodiments of the invention reduce the risk of the token being utilized for fraud. This is because portions of a token are dispersed to multiple entities and collected during a transaction, rather than transmitting the whole token multiple times. This mitigates the risk that the token can be stolen by an intermediary and increases security of the transaction compared to conventional systems and methods.

Figure 2:
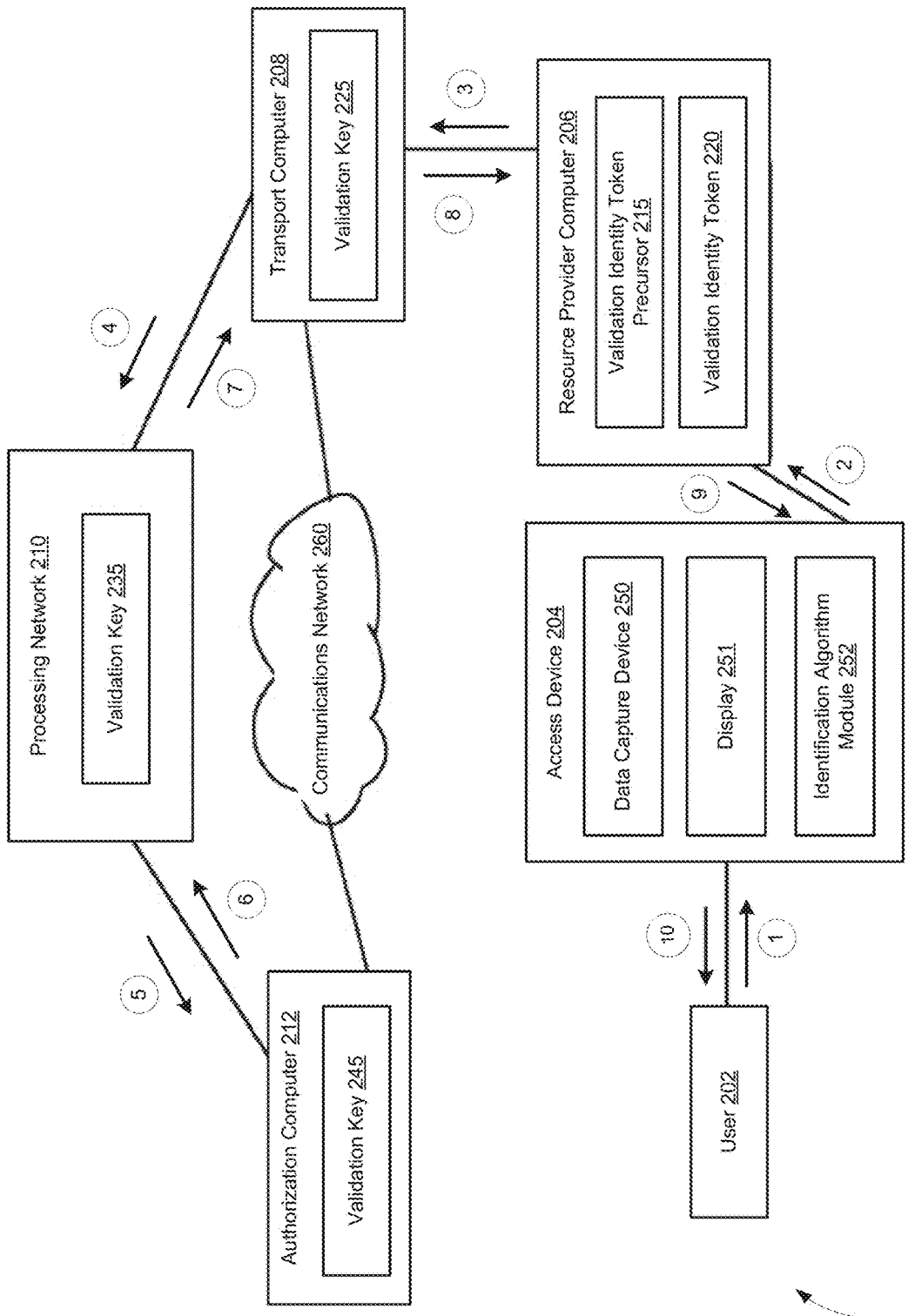
FIG. 2 shows a block diagram of an exemplary system according to embodiments of the invention.

FIG. 2 shows a block diagram 200 of a system according to embodiments of the invention. FIG. 2 includes a user 202, an access device 204, a resource provider computer 206, a transport computer 208, a processing network 210, and an authorization computer 212. Any of the devices in FIG. 2 (e.g., access device 204, resource provider computer 206, transport computer 208, processing network 210, and authorization computer 212) may be in communication by a suitable communications network, such as communications network 260. User 202 may conduct a transaction with the resource providing entity associated with resource provider computer 206.

Access device 204 may be any suitable device that provides access to a remote system. Access device 204 may be in any suitable form. Some non-limiting examples of access device 204 may include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. Access device 204 may use any suitable contact or contactless mode of operation to send or receive data from, or associated with a user device (e.g., payment device) associated with user 202. In some embodiments, access device 204 may be a client computer associated with resource provider computer 206.

Access device 204 may also be used for communicating with other systems. For example, access device 204 may communicate with resource provider computer 206, transport computer 208, a processing network 210, authorization computer 212, or any other suitable system. Access device 204 may generally be located in any suitable location, such as at the location of the resource providing entity associated with resource provider computer 206. In some embodiments, access device 204 may receive data from a user device for a remote transaction (e.g., e-commerce transaction) and may forward the received data to an appropriate entity.

Access device 204 may enable interaction with user 202, such as receive identification data (e.g., biometric data) from user 202. Access device 204 may comprise a data capture device 250, a display 251, and an identification algorithm module 252. Similar components of access device 204 may be described in more detail in FIG. 3.

Resource provider computer 206 may be a device that is associated with a resource providing entity. The resource providing entity may engage in transactions, sell goods or services, or provide access to goods or services to user 202. Resource provider computer 206 may accept multiple forms of payment and may be associated with multiple tools to conduct different types of transactions. For example, resource provider computer 206 may be associated with access device 204 and communicate information to and from access device 204. In some cases, resource provider computer 206 may host a website associated with the resource providing entity through which the user may conduct an enrollment process or make a transaction. In some embodiments, resource provider computer 206 may store a validation identity token precursor 215 or a validation identity token 220.

Transport computer 208 may be a device that may transmit information between entities. Transport computer 208 may be associated with resource provider computer 206, and may manage authorization requests on behalf of resource provider computer 206. Transport computer 208 may also handle token request messages on behalf of the resource provider computer 208. For example, in some embodiments, transport computer 208 may receive and forward token request messages in the same manner as authorization request messages. In some cases, transport computer 208 may be an acquirer computer associated with an acquirer. In some embodiments, transport computer 208 may store a plurality of validation keys, including a validation key 225.

Processing network 210 may include data processing subsystems, networks, and operations used to support and deliver authorization services, exception file services, and clearing and settlement services. For example, processing network 210 may comprise a server coupled to a network interface (e.g., by an external communication interface), and databases of information. In some cases, processing network 210 may be a transaction processing network (e.g., payment processing network). Processing network 210 may use any suitable wired or wireless network, including the Internet. In some embodiments, processing network 210 may store a plurality of validation keys, including a validation key 235.

Authorization computer 212 may be a device associated with an authorizing entity. Authorization computer 212 may authorize an entity to conduct a transaction or to receive access to goods or services on behalf of the authorizing entity. Authorization computer 212 may receive and process an authorization request message, as well as generate and transmit an authorization response message. In some cases, authorization computer 212 may be an issuer computer. In some embodiments, authorization computer 212 may store a plurality of validation keys, including a validation key 245.

In some cases, at a later time (e.g., at the end of the day), a clearing and settlement process can occur between transport computer 208, processing network 210, and authorization computer 212.

Communications network 260 may be any suitable network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 3:
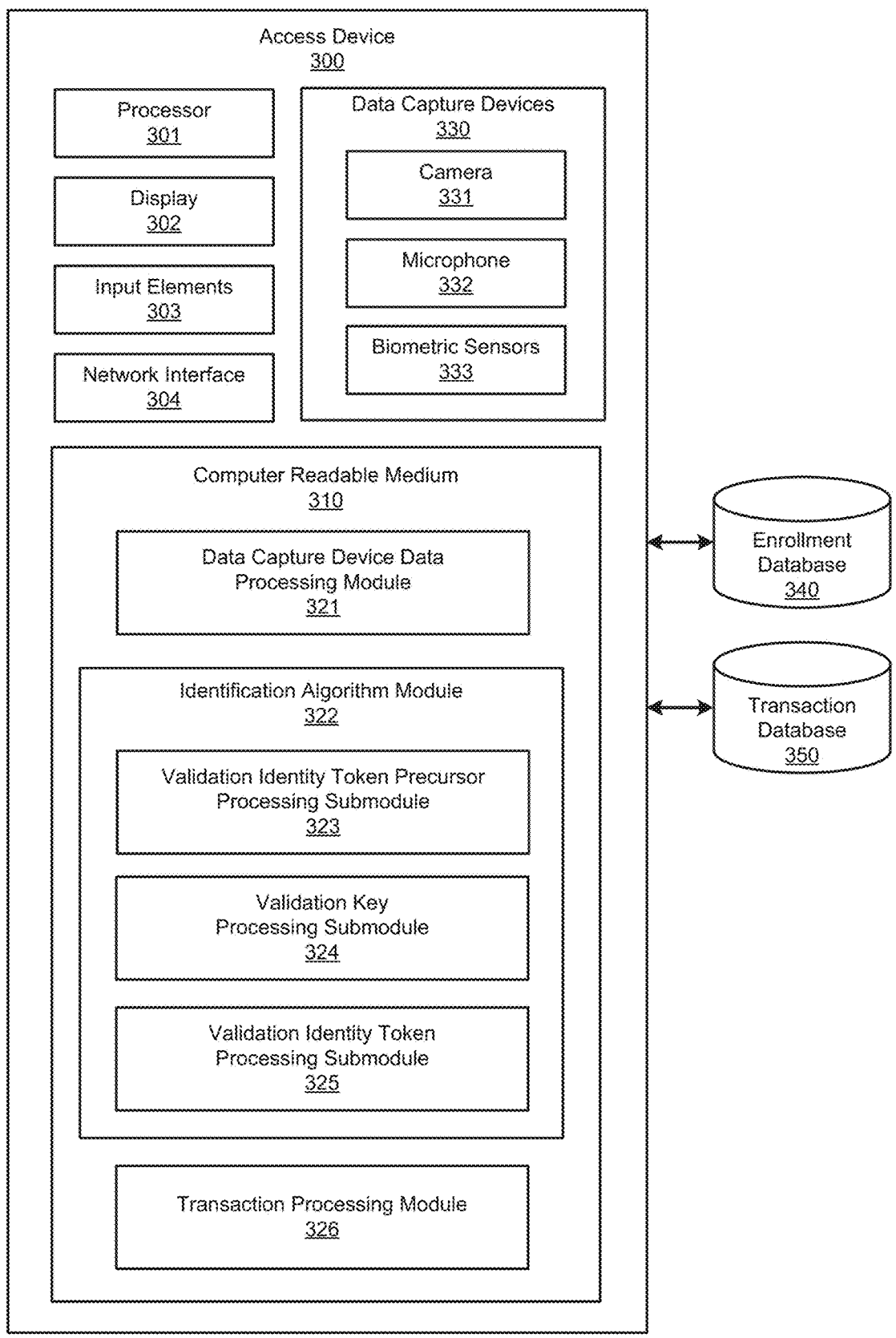
FIG. 3 shows a block diagram of an exemplary access device according to embodiments of the invention.

FIG. 3 shows a block diagram of an access device 300 according to embodiments of the invention. Access device 300 may include a processor 301, a display 302, input elements 303, and a network interface 304. Access device 300 may also include data capture devices 330, which may comprise a camera 331, a microphone 332, and biometric sensors 333. Access device 300 may also include a computer readable medium 310 and may be in communication with one or more databases, such as enrollment database 340 and transaction database 350.

Processor 301 may include hardware for processing functions of access device 300. Processor 301 may include hardware within access device 300 that carries out instructions embodies as code in computer readable medium 310 (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Display 302 may be a screen that can show information to a user. In some cases, display 302 may be any suitable screen that enables touch functionality. In some embodiments, display 302 of access device 300 may display a user interface that may allow the user to select and interact with objects presented on display 302. The objects may include, but may not be limited to, menus, text fields, icons, and keys/inputs on a virtual keyboard. In some embodiments, display 302 may show an output from a data capture device from data capture device 330 (e.g., images from camera 231). Display 320 may be capable of displaying colors. In some embodiments, display 320 may enable a user to manually provide an electronic signature to access device 300 by directly touching display 320 with their finger or suitable touch screen stylus pen.

Input elements 303 may allow a user to input information into the device. Exemplary input elements 303 include hardware and software buttons, audio detection devices (e.g., microphone), biometric sensors, touch screens, and the like. In some cases, one or more of input elements 303 may be utilized to navigate through various screens presented by display 302 of access device 300. In some cases, a user may activate one or more of input elements 303 to pass identification data (e.g., PAN, driver's license number, etc.) to access device 300.

Network interface 304 may be any suitable combination of hardware and software that enables data to be transferred to and from access device 300. Network interface 304 may enable access device 300 to communicate data to and from another device (e.g., resource provider computer, transport computer, processing network, authorization computer, etc.). Some examples of network interface 304 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 304 may include Wi-Fi™.

Data transferred via network interface 304 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 304 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Data capture devices 330 may include any devices that can capture data. In some embodiments, the data may be identification data of a user. Data capture device 330 may comprise camera 331, microphone 332, and biometric sensors 333.

Camera 331 may be any suitable device capable of capturing image data. In some embodiments, camera 331 may capture images in certain time intervals and append them to generate a motion video. In some embodiments, camera 331 may have facial recognition technologies, such that it can differentiate the foreground (e.g., face of user) from the background of an image. In some cases, camera 331 may then subtract any unnecessary background data from the image. Camera 331 may be embedded in access device 300 or be an external attachment to access device 300.

Microphone 332 may be any suitable device that can convert sound to an electrical signal. Microphone 332 may be utilized to capture one or more voice segments from a user. For example, microphone 332 may allow the user to transmit his or her voice to access device 300. In some embodiments, the user may utilize voice commands detected by microphone 332 to provide instructions to access device 300.

Biometric sensors 333 may be any suitable devices that can capture biometric information. In some embodiments, biometric sensors 333 may capture biometric information from a user in the form of a fingerprint reader, an iris scanner, a face scanner, or other suitable form. Biometric information captured by biometric sensors 333 may uniquely identify a user. In some embodiments, biometric sensors 333 may include or work in conjunction with other data capture devices in data capture devices 330, such as camera 331 an microphone 332.

Computer readable medium 310 may comprise a number of software modules. For example, computer readable medium 310 may include a data capture device data processing module 321, an identification algorithm module 322, and a transaction processing module 326. In some embodiments, identification algorithm module 322 may include a validation identity token precursor processing submodule 323, a validation key processing submodule 324, and a validation identity token processing submodule 325.

Other modules and submodules may also reside on computer readable medium 310. Examples of additional modules may include an authorization module for processing and routing authorization request and response messages, a clearing and settlement module for processing and routing clearing messages and performing settlement between parties, and data extraction (e.g., for retrieving data from external data sources such as databases) modules, storage modules, and message modification modules. Each module in computer readable medium 310 may be combined with any of the additional modules as appropriate. Each module in computer readable medium 310 may comprise one or submodules, where each submodule may comprise one or more functions implemented by code, executable by processor 301.

Data capture device data processing module 321 may enable, with processor 301, processing of data captured by one or more devices of data capture devices 330. In some embodiments, the captured data may be identification data associated with a user conducting a transaction. Data capture device data processing module 321 may receive, with processor 301, identification data captured by one or more devices of data capture devices 330. The captured data may be in any suitable form (e.g., numerical characters, alphanumeric characters, arrays, lists, matrices, etc.). Data capture device processing module 321 may receive, with processor 301, the captured identification data in real-time (e.g., receive each frame of a video of user's face in real-time) or after a certain time period (e.g., receive all frames of a video of user's face after video capture is terminated).

Additionally, data capture device data processing module 321 may comprise computer code for determining a data capture device from which identification data is captured (e.g., camera 331, microphone 332, biometric sensors 333) and the type of identification data captured (e.g., facial images, iris scans, voice segments, fingerprint information, user identifiers, etc.). In some embodiments, data capture device may include computer code for detecting data capture devices that are activated and collecting identification data. Data capture device processing module 321 may, with processor 301, transmit at least the captured identification data and an indication of the type of the captured identification data to identification algorithm module 322.

Identification algorithm module 322 may enable, in conjunction with processor 301, processing of data for validating a user. Identification algorithm module 322 may receive, with processor 301, identification data from data capture device data processing module 321. Identification algorithm module 322 may comprise code for determining whether the user is conducting an enrollment process or a transaction and for sending any identification data to appropriate submodules within identification algorithm module 322.

Validation identity token precursor processing submodule 323 may enable, with processor 301, generation and processing of a validation identity token precursor. During enrollment, validation identity token precursor processing submodule 323 may generate, with processor 301, a validation identity token precursor that is unique to the user. This validation identity token precursor may also be known as the enrolled validation identity token precursor. Validation identity precursor processing submodule 323 may comprise computer code for storing the validation identity token precursor generated during enrollment in enrollment database 340 in a data record associated with the user. Validation identity precursor processing submodule 323 may also comprise computer code for sending the enrolled validation identity token precursor to validation identity token processing submodule 325.

Validation identity token precursor processing submodule 323 may comprise computer code for determining an algorithm to utilize for generating a validation identity token precursor, based on the type of identification data received from data capture device data processing module 321. For example, if the received identification data comprises facial images, iris scans, or fingerprint information, validation identity token precursor processing submodule 323 may generate, with processor 301, a trigonometric identity value based on the physical points in the facial images, iris scans, or fingerprint information.

Validation identity token precursor processing submodule 323 may further comprise computer code for generating a validation identity token precursor during a transaction conducted by the user. Validation identity token precursor processing submodule 323 may apply, with processor 301, the same algorithm utilized during enrollment to generate the validation identity token precursor. Validation identity precursor processing submodule 323 may comprise computer code for sending the validation identity token precursor generated during the transaction to validation identity token processing submodule 325.

Validation key processing submodule 324 may enable, with processor 301, generation and processing of validation keys. During enrollment, validation key processing submodule 324 may generate, with processor 301, validation keys based on identification data of the user. Validation key processing submodule 324 may also comprise computer code for transmitting the generated validation keys to appropriate entities (e.g., remote server computers) during the enrollment process. For example, validation key processing submodule 324 may comprise computer code for determining to which entities to send validation keys and for determining a distribution of the generated validation keys (e.g., number of validation keys for each remote server computer, etc.). In some embodiments, the determination may be made during the enrollment process (e.g., randomized). In some embodiments, the distribution of validation keys may be predefined.

Validation key processing submodule 324 may comprise computer code for determining an algorithm to utilize for generating validation keys, based on the type of identification data received from data capture device data processing module 321. For example, if the received identification data comprises facial images, iris scans, or fingerprint information, validation key processing submodule 324 may generate, with processor 301, validation keys, where each validation key may be generated based on a certain portion of the facial images, iris scans, or fingerprint information. In some implementations, each validation key may correspond to a value representing a physical point (e.g., distance from nose) on the facial images, iris scans, or fingerprint information.

Validation identity token processing submodule 325 may enable, with processor 301, generation and processing of a validation identity token. Validation identity token processing submodule 325 may comprise code for generating a validation identity token, also known as the enrolled validation identity token, during the enrollment process, based on combining validation keys and in some cases, the enrollment validation identity token precursor. Validation identity token processing submodule 325 may comprise computer code for storing the enrolled validation identity token in enrollment database 340 in a data record associated with the user.

Validation identity token processing submodule 325 may also comprise code for generating a validation identity token during a transaction conducted by the user, based on validation keys and in some cases, the validation identity token precursor generated during the transaction. Validation identity token processing submodule 325 may utilize, with processor 301, the same algorithm for generating the validation identity token during enrollment and the validation identity token during the transaction. The algorithm may comprise any suitable combination of operations (e.g., summation, subtraction, multiplication by coefficients, etc.) that utilize at least the validation keys retrieved during the transaction.

Transaction processing module 326 may enable, with processor 301, any processing of data related to a transaction. Transaction processing module 326 may generate, with processor 301, a request message including identification data of the user received by data capture device data processing module 321 and may send, with processor 301, the request message to other entities (e.g., resource provider computer, transport computer, processing network, authorization computer). In some embodiments, transaction processing module 326 may comprise computer code for including an identifier in the request message or for sending the identifier with the request message, where the identifier indicates that the transaction is to be conducted with a validation identity token.

Transaction processing module 326 may also comprise code for processing a response message. Transaction processing module 326 may, with processor 301, retrieve validation keys included in the response message by other entities and may, with processor 301, send them to validation identity token processing submodule 325 for generating a validation identity token for the transaction. Transaction processing module 326 may comprise computer code for determining whether the user can be authenticated based on comparing the generated validation identity token and the previously enrolled validation identity token of the user. Transaction processing module 326 may enable, with processor 301, storage of any data related to the transaction in transaction database 350 in a data record associated with the user.

Access device 300 may also comprise several databases, including enrollment database 340 and transaction database 350. Each database may be a conventional, fault tolerant, relational, scalable, secure database such as those commercially available from Oracle™ or Sybase™. In some embodiments, any of the databases may be combined into a single database, or may be separated into multiple databases. Access device 300 may have other databases that are not shown in FIG. 3.

Enrollment database 340 may store any data associated with enrollment. In some embodiments, enrollment database 340 may store enrollment data associated with a plurality of users. Information associated with each user may be stored in a data record associated with the user. Enrollment data may include any information provided by a user during an enrollment process. For example, the information may include identification data of the user, such as an account identifier (e.g., PAN, email address, etc.), biometric data (e.g., facial images, iris scans, voice prints, fingerprint information, etc.), and any other information that may be utilized to identify the user (e.g., name, etc.). Additionally, in some cases, the information may include an enrolled validation identity token precursor and an enrolled validation identity token associated with the user.

Transaction database 350 may store any data related to transactions. In some embodiments, transaction database 350 may store transaction data associated with a plurality of users. Information associated with each user may be stored in a data record associated with the user. In some cases, the data stored in transaction database 350 may include a timestamp, a response message, an authorization decision, an indicator indicating whether the user was authenticated with a valid validation identity token, and any other data related to a transaction.

In some embodiments, access device 300 may not include some components shown in FIG. 3. In some cases, access device 300 may not include some functionality of identification algorithm module 322. For example, in some embodiments, access device 300 may not conduct enrollment processes. Accordingly, computer code for performing enrollment related processes may not exist in access device 300. Additionally, access device 300 may not be in communication with enrollment database 340. In some embodiments, described in more detail below, a validation identity token precursor may not be utilized to generate a validity identity token. Hence, in some cases, computer code for generating and processing validity identity token precursors may not exist in access device 300.

Figure 4:
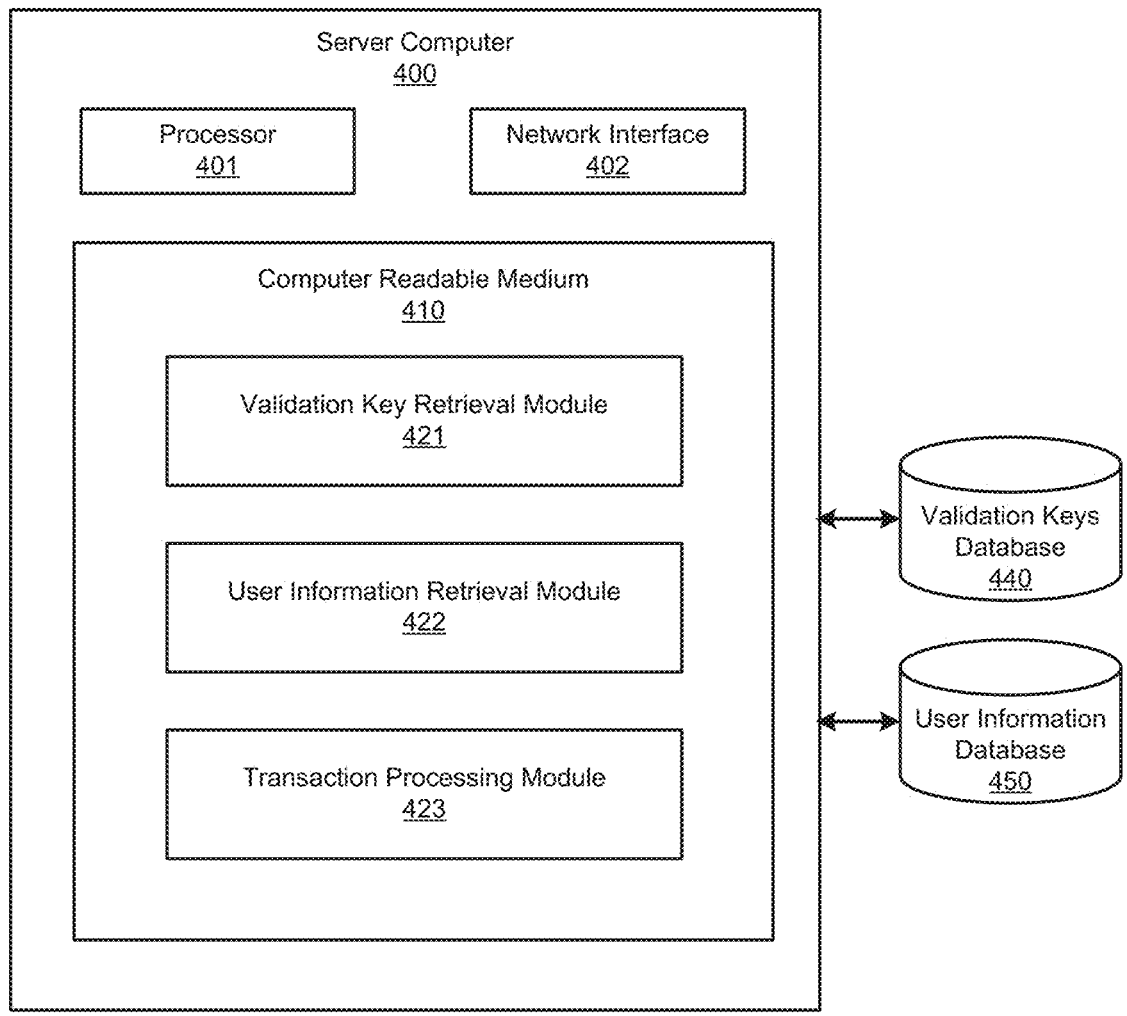
FIG. 4 shows a block diagram of an exemplary server computer according to embodiments of the invention.

FIG. 4 shows a block diagram of an exemplary server computer 400 according to embodiments of the invention. Server computer 400 may include a processor 401, a network interface 402, and a computer readable medium 410. Server computer 400 may also be in communication with one or more databases, such as validation keys database 440 and user information database 450. In some embodiments, server computer 400 may be a processing network.

Processor 401 may include hardware for processing functions of server computer 400. Processor 401 may include hardware within server computer 400 that carries out instructions embodies as code in computer readable medium 410 (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Network interface 402 may be any suitable combination of hardware and software that enables data to be transferred to and from server computer 400. Network interface 402 may enable server computer 400 to communicate data to and from another device (e.g., access device, resource provider computer, transport computer, processing network, authorization computer, etc.). Some examples of network interface 402 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 402 may include Wi-Fi™.

Data transferred via network interface 402 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 402 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Computer readable medium 410 may comprise a number of software modules. For example, computer readable medium 410 may include a validation key retrieval module 421, a user information retrieval module 422, and a transaction processing module 423.

Other modules and submodules may also reside on computer readable medium 410. Examples of additional modules may include an authorization module for processing and routing authorization request and response messages, a clearing and settlement module for processing and routing clearing messages and performing settlement between parties, and data extraction (e.g., for retrieving data from external data sources such as databases) modules, storage modules, and message modification modules. Each module in computer readable medium 410 may be combined with any of the additional modules as appropriate. Each module in computer readable medium 410 may comprise one or submodules, where each submodule may comprise one or more functions implemented by code, executable by processor 401.

Validation key retrieval module 421 may enable, in conjunction with processor 401, retrieval of one or more validation keys for a transaction. Validation key retrieval module 421 may comprise computer code for receiving user identification data (e.g., email address, driver's license number, validation identity token precursor, etc.) from transaction processing module 423 and for retrieving the validation keys from validations keys database 440 based on the identification data. Validation key retrieval module 421 may send, with processor 401, the retrieved validation keys to transaction processing module 234.

User information retrieval module 422 may enable, with processor 401, retrieval of data related to a user conducting a transaction. User information retrieval module 422 may comprise computer code for receiving user identification data (e.g., email address, driver's license number, validation identity token precursor, etc.) from transaction processing module 423. User information retrieval module 422 may also comprise computer code for retrieving user information that may be utilized for processing the transaction from user information database 450, based on the received identification data. In some embodiments, the transaction may be a financial transaction and the retrieved user information may be account information (e.g., PAN).

Transaction processing module 423 may enable, with processor 401, any processing of data related to a transaction. For example, transaction processing module 423 may comprise code for processing a received request message.

Transaction processing module 423 may comprise code for determining that, based on an identifier included in or sent with the request message, the transaction will involve a validation identity token. In some embodiments, no identifier may be received and transaction processing module 423 may determine, with processor 401, that the transaction will involve a validation identity token based on receiving a validation identity token precursor in the request message. Transaction processing module 423 may send, with processor 401, an instruction to validation key retrieval module 421 to retrieve any relevant validation keys. Transaction processing module 423 may comprise computer code for receiving the retrieved validation keys and for updating the request message to include the retrieved validation keys. Transaction processing module 423 may transmit, with processor 401, the request message to another server computer.

Server computer 400 may also comprise several databases, including validation keys database 440 and user information database 450. Each database may be a conventional, fault tolerant, relational, scalable, secure database such as those commercially available from Oracle™ or Sybase™. In some embodiments, any of the databases may be combined into a single database, or may be separated into multiple databases. Server computer 400 may have other databases that are not shown in FIG. 4.

Validation keys database 440 may store any data related to validation keys. In some embodiments, validation keys database 440 may store enrollment data associated with a plurality of users. Information associated with each user may be stored in a data record associated with the user. Validation keys database 440 may store validation keys of the user in association with identification data associated with the user received during enrollment.

User information database 450 may store any data related to a user. In some embodiments, user information database 450 may store user information associated with a plurality of users. Information associated with each user may be stored in a data record associated with the user. In some cases, user information database 450 may store identification data of the user, such as account information (e.g., PAN), a validation identity token precursor, or any other information that may help to identity a user. In some cases, user information database 450 may store transaction data, such as data related to past transactions, associated with the user.

In some embodiments, server computer 400 may include some components not shown in FIG. 4. In some cases, server computer 400 may include some functionality of an identification algorithm module, similar to identification algorithm module 322 of FIG. 3. For example, in some embodiments, server computer 400 may conduct enrollment processes (e.g., instead of access device 300 of FIG. 3). Accordingly, in such embodiments, computer code for performing enrollment related processes may exist in server computer 400. Additionally, server computer 400 may be in communication with an enrollment database.

Referring back to FIG. 2, steps in a method according to an embodiment of the invention are shown. User 202 may conduct a transaction with the resource providing entity associated with resource provider computer 206. Multiple embodiments of the invention may be described.

Figure 5:
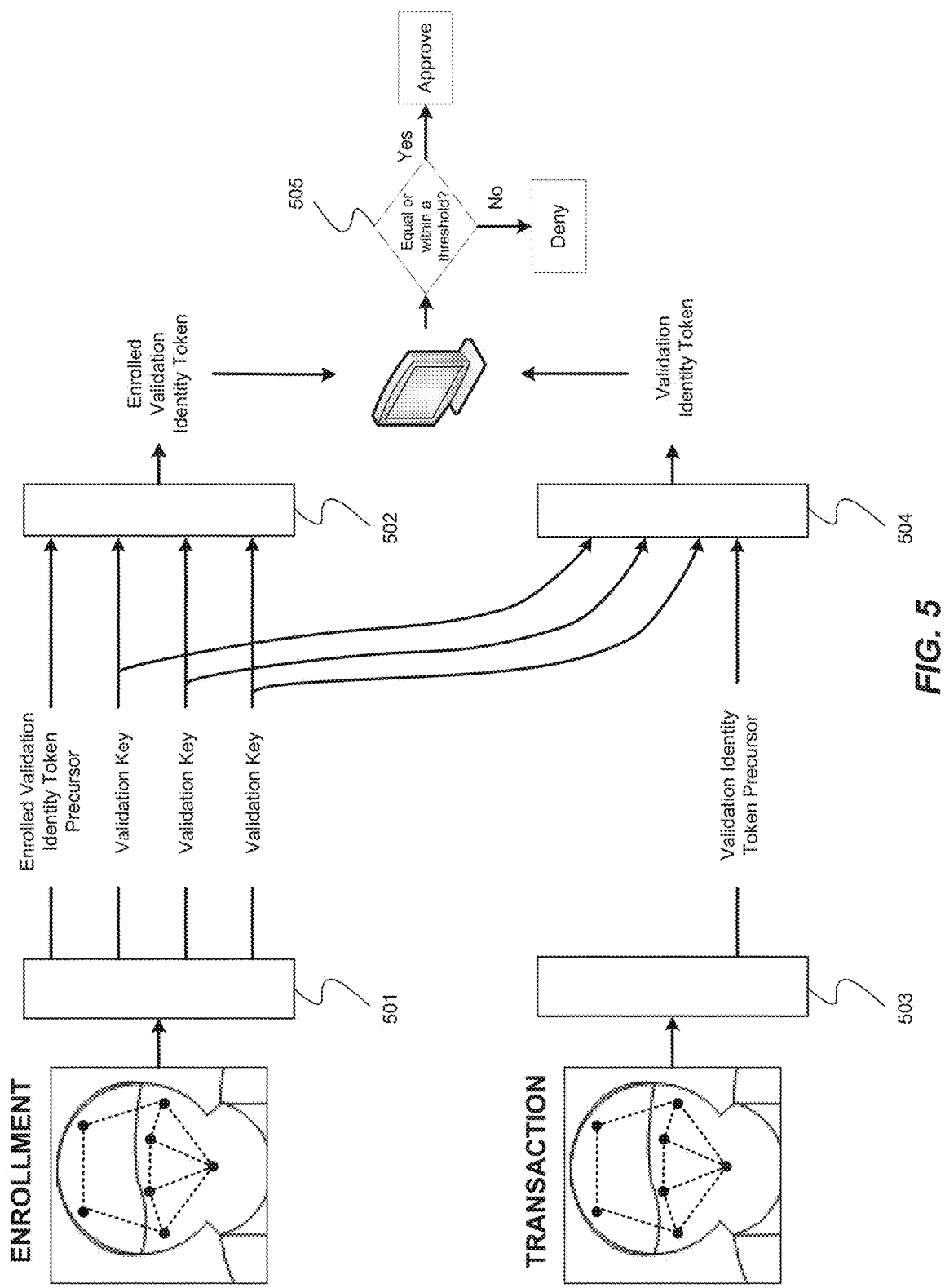
FIG. 5 shows a flow diagram for processing a validation identity token according to embodiments of the invention.

One embodiment of the invention is described with respect to FIG. 2. Some steps may be described with respect to components of FIG. 5. Prior to the steps shown in the exemplary flowchart of FIG. 2, user 202 may conduct an enrollment process.

In one embodiment, user 202 may conduct the enrollment process with access device 204 associated with resource provider computer 206. Initially, user 202 may provide enrollment data to access device 204. In some embodiments, the enrollment data may include identification data, such as any combination of biometric data (e.g., facial image, iris scan, voice prints, fingerprint scans, etc.) and account identifiers (e.g., PAN, driver's license number, etc.) associated with user 202.

User 202 may provide their enrollment data in any suitable manner. In some cases, user 202 may physically be at the location of access device 204 and may directly provide identification data into access device 204. For example, user 202 many interact with data capture device 250 to enter biometric data (e.g., camera of access device 204 takes picture of user 202) and other input elements to enter account identifiers and other account information (e.g., user enters PAN with buttons of access device 204). In other cases, user 202 may provide enrollment data by sending identification data captured by their user device over a communications network to access device 204 or resource provider computer 208 associated with access device 204. For example, user 202 may access an application or website associated with resource provider computer 206, enter their identification data into the application or website (e.g., user takes picture of their face with the camera of their user device and types in account identifier with the keyboard of their user device), and confirm transmission of the identification data to resource provider computer 206. Resource provider computer 206 may forward the identification data to access device 204.

Access device 204 may then process the enrollment data. In some embodiments, access device 204 may generate multiple pieces of information during the enrollment process (e.g., process 501 in FIG. 5) using functionality provided by identification algorithm module 252.

In some embodiments, access device 204 may generate a validation identity token precursor based on identification data included in the enrollment data. This validation identity token precursor may also be known as the enrolled validation identity token precursor. The enrolled validation identity token precursor may be any information that may be based on or derived from identification data included in the enrollment data and may be utilized to uniquely identity user 202. In one exemplary case, the identification data may comprise an image of the face of user 202 and the enrolled validity identity token precursor may be a trigonometric identity calculated using a plurality of physical points on the image of the face of user 202. The trigonometric identity may be unique to user 202. An exemplary method for calculating the trigonometric identity is described.

First, information related to multiple points from the image of the face of user 202 may be gathered. In some cases, the points may be positioned such that they create an n-sided polygon spanning the outer edge of the head, eyes, nose, mouth, and chin of the face. Each point may be associated with a set of coordinates (e.g., x, y coordinates). While an embodiment utilizing a two-dimensional coordinate system is described for simplicity, a three-dimensional coordinate system may be utilized. In such cases, the camera of access device 204 may be able to generate a three-dimensional representation of user's face (e.g., digital 3D model, topographic map, etc.).

Next, a trigonometric identity may be calculated based on the gathered points. Numerical values may be calculated associated with the points gathered. In one exemplary case, a distance from each point to another part of the face may be calculated. For example, the distance may from a point to the tip of nose, top of the forehead, bottom of the chin, or any other suitable position that can be detected from the image. It is understood that the distance may be calculated using geometric principles, such as calculating the hypotenuse length of a right triangle in which two point positions are known.

These numerical values may then be utilized as parameters for a combination of operations that may be predefined by access device 204. In some embodiments, the operations may comprise a summation based on the distance values. For example, the distance values may be totaled to generate a value. In another example, ratios of certain distance values (e.g., ratio between distances to tip of nose and distances to top of forehead, etc.) may be calculated and summed together. It is understood that the embodiments described above are specific examples and are not limiting. Any suitable combination of operations (e.g., addition, subtraction, multiplication, division, exponentiation, averaging, etc.) may be utilized.

Accordingly, the resulting value may be generated based on unique features of the user (e.g., facial structure) and may serve as the enrolled validation identity token precursor associated with the user. In some embodiments, the enrolled validation identity token precursor may be stored by access device 204 in any suitable storage, such as a database (e.g., enrollment database).

In some embodiments, access device 204 may generate a plurality of validation keys associated with user 202 using identification data included in the enrollment data. In some embodiments, each validation key may be generated based on a certain portion of the identification data. In one example, access device 204 may generate three validation keys (e.g., first, second, third keys, etc.), validation key 225, validation key 235, and validation key 245, where each validation key may be generated based on a different section of the image of the face of user 202. For example, a first validation key may be generated based on one or more points located in a first section of the image. The first validation key may be a numerical value associated with any of the one or more points, such as a distance between two of the one or more points, a distance between one of the points to another location on the face (e.g., tip of the nose), or a ratio between two distance values generated based on the points.

In some embodiments, access device 204 may send the validation keys to a plurality of remote server computers. Each server computer may receive one or more validation keys that may be utilized to form at least part of a validation identity token. In the example depicted in FIG. 2, access device 204 may send a different validation key to each of a plurality of remote server computers, including validation key 225 to transport computer 208, validation key 235 to processing network 210, and validation key 245 to authorization computer 212.

In some embodiments, each of the remote server computers may store the received validation key in association with other identification data of user 202. For example, access device 204 may send the validation key in association with an account identifier (e.g., PAN, email address, etc.) provided by user 202 during enrollment. This may enable certain remote server computers, such as processing network 210, to associate the received validation key with information that may already be stored related to user 202 (e.g., payment account information). In some embodiments, access device 204 may also send the enrolled validation identity token precursor in association with the validation key. Each of the remote server computers may utilize such information associated with the validation key to retrieve an appropriate validation key associated with user 202 at a later time (e.g., during a future transaction.

Access device 204 may generate a validation identity token. This validation identity token may also be known as the enrolled validation identity token. In some embodiments, the enrolled validation identity token may be generated using the enrolled validation identity token precursor and the validation keys (e.g., process 502 in FIG. 5). In one example, the enrolled validation identity token may be a summation of the validation identity token precursor and validation keys. However, any combination of operations may be utilized to generate the enrolled validation identity token, such that access device 204 may be able to regenerate the validation identity token given the appropriate parameters. In some embodiments, resource provider computer 206 associated with access device 204 may store the enrolled validation identity token in any suitable storage, such as a database (e.g., enrollment database).

At any time after completion of the enrollment process, user 202 may conduct a transaction. In the embodiment described, the transaction may be performed by user 202 without utilizing a user device (e.g., cardless).

At step 1, user 202 initiates a transaction by providing identification data to access device 204 during a transaction. In some embodiments, user 202 may provide identification data by interacting with data capture device 250 of access device 204. In one embodiment, data capture device 250 may be a camera, which may capture one or more images of the face of user 202.

At step 2, access device 204 may process the identification data. In some embodiments, access device 204 may generate certain information based on the identification data and store the information at resource provider computer 206. In some implementations, access device 204 may generate a validation identity token precursor 215 based on the identification data provided by user 202 (e.g., process 503 in FIG. 5). Validation identity token precursor 215 may be generated by access device 204 using the algorithm utilized to generate the enrolled validation identity token precursor during the enrollment process (see above). Thus, it is expected that validation identity token precursor 215 is the same or similar to the enrolled validation identity token precursor if user 202 conducts the transaction. In some cases, resource provider computer 206 may store validation identity token precursor 215 received from access device 204.

In some embodiments, access device 204 may generate a request message comprising identification data of user 202. For example, the request message may comprise validation identity token precursor 215. The validation identity token precursor 215 may indicate to other entities receiving the request message that user 202 is conducting the transaction.

In some embodiments, remote entities (e.g., transport computer 208, processing network 210, and authorization computer 212) may determine that the transaction is to involve a validation identity token based on recognizing that a validation identity token precursor was received in the request message. In other embodiments, an identifier may be included in or sent with the request message such that the remote entities may recognize that the transaction will utilize a validation identity token. This may instruct the remote entities to retrieve appropriate validation keys for the transaction.

At step 3, the request message comprising identification data of user 202 may be sent to transport computer 208. In some embodiments, access device 204 may send the request message to transport computer 208 via resource provider computer 206. Transport computer 208 may receive the request message including validation identity token precursor 215. In some embodiments, transport computer 208 may have validation key 225 associated with user 202 stored in association with the enrolled validation identity token precursor. Transport computer 208 may retrieve validation key 225 based on matching validation identity token precursor 215 and the enrolled validation identity token precursor of user 202. Transport computer 208 may then include validation key 225 in the request message.

It is understood that in some cases, validation key 225 may be stored in association with other information related to validation identity token precursor 215 that is not the enrolled validation identity token precursor. For example, validation key 225 may be stored in association with a hash value of the enrolled validation identity token precursor. In this case, transport computer 208 may generate a hash of validation identity token precursor 215 upon receiving the request message and retrieve validation key 225 based on matching the hash of the enrolled validation identity token precursor and the hash of validation identity token precursor 215. In other embodiments, the other information may be any other identification data (e.g., email address, driver's license number, etc.) that may be stored by transport computer 208 during the enrollment process and which may be provided by user 202 during the transaction. Transport computer 208 may then retrieve validation key 225 based on the other information and include validation key 225 in the request message.

At step 4, the request message comprising identification data of user 202 may be sent to processing network 210. Processing network 210 may receive the request message including validation identity token precursor 215. In some embodiments, processing network 210 may have validation key 235 associated with user 202 stored in association with the enrolled validation identity token precursor. Processing network 210 may retrieve validation key 235 based on matching validation identity token precursor 215 and the enrolled validation identity token of user 202. Processing network may include validation key 235 in the request message.

It is understood that in some cases, validation key 235 may be stored in association with other information related to validation identity token precursor 215 that is not the enrolled validation identity token precursor. For example, validation key 235 may be stored in association with a hash value of the enrolled validation identity token precursor. In this case, processing network 210 may generate a hash of validation identity token precursor 215 upon receiving the request message and retrieve validation key 235 based on matching the hash of the enrolled validation identity token precursor and the hash of validation identity token precursor 215. In other embodiments, the other information may be any other identification data (e.g., email address, driver's license number, etc.) that may be stored by processing network 210 during the enrollment process and which may be provided by user 202 during the transaction. Processing network 210 may then retrieve validation key 235 based on the other information and include validation key 235 in the request message.

Additionally, in some embodiments, processing network 210 may retrieve further information related to user 202 and include the information in the request message. For example, processing network 210 may retrieve account information associated with user 202 based on identification data in the request message. In some embodiments, processing network 210 may have the account information stored in association with the enrolled validation identity token precursor. In some cases, the account information may include a PAN associated with a payment account of user 202. Processing network 210 may include the account information in the request message, which may help authorization computer 212 identify the account of user 202 to utilize for the transaction.

At step 5, the request message comprising identification data of user 202 may be sent to authorization computer 212. Authorization computer 212 may receive the request message including validation identity token precursor 215. In some embodiments, authorization computer 212 may have validation key 245 associated with user 202 stored in association with the enrolled validation identity token precursor. Authorization computer 212 may retrieve validation key 245 based on matching validation identity token precursor 215 and the enrolled validation identity token of user 202.

It is understood that in some cases, validation key 245 may be stored in association with other information related to validation identity token precursor 215 that is not the enrolled validation identity token precursor. For example, validation key 245 may be stored in association with a hash value of the enrolled validation identity token precursor. In this case, authorization computer 212 may generate a hash of validation identity token precursor 215 upon receiving the request message and retrieve validation key 245 based on matching the hash of the enrolled validation identity token precursor and the hash of validation identity token precursor 215. In other embodiments, the other information may be any other identification data (e.g., email address, driver's license number, etc.) that may be stored by authorization computer 212 during the enrollment process and which may be provided by user 202 during the transaction. Authorization computer 212 may then retrieve validation key 245 based on the other information.

Additionally, in some embodiments, authorization computer 212 may retrieve further information related to user 202. For example, based on the account information (e.g., PAN) included in the request message by processing network 210, authorization computer 212 may be able to identify the account of user 202 to utilized for the transaction. Accordingly, authorization computer 212 may conduct an authorization process to determine whether the transaction may be authorized. For example, authorization computer 212 may conduct fraud analyses based on historical information related to the account of user 202 and information surrounding the transaction. In some embodiments, the fraud analyses may include checks on any abnormalities of characteristics associated with the transaction (e.g., location, transaction amount, resource provider type, etc.). Authorization computer 212 may determine whether the transaction may be authorized.

At step 6, authorization computer 212 may generate a response message and send the response message to processing network 210. In some embodiments, the response message may comprise information including at least validation key 225 and validation key 235 included in the request message, validation key 245 retrieved by authorization computer 212, and an authorization decision based on the authorization process conducted by authorization computer 212. In some cases, the response message may further comprise any fraud information related to the transaction collected in step 5. In some embodiments, the response message may also include validation identity token precursor 215. Authorization computer 212 may send the response message to processing network 210. The response message may be sent over any suitable communication network, such as communications network 260.

At step 7, processing network 210 may send the response message to transport computer 208. The response message may be sent over any suitable communication network, such as communications network 260.

At step 8, transport computer 208 may send the response message to resource provider computer 206. The response message may be sent over any suitable communication network, such as communications network.

At step 9, resource provider computer 206 may forward the response message to access device 204, which may determine whether user 202 may be authenticated. In some embodiments, access device 204 may generate a validation identity token 220, which can indicate whether the transaction is valid. In some implementations, access device 204 may generate validation identity token 220 using information provided in the response message. For example, this information may include validation key 225, validation key 235, validation key 245, and validation identity token precursor 215 (e.g., process 504 in FIG. 5). In embodiments in which the response message does not include validation identity token precursor 215 (e.g., if authorization computer 212 did not send validation identity token precursor 215 back), access device 204 may retrieve validation identity token precursor 215 from resource provider computer 206.

Validation identity token 220 may be generated by access device 204 using the algorithm utilized to generate the enrolled validation identity token during the enrollment process (see above). Thus, it is expected that validation identity token 220 is the same or similar to the enrolled validation identity token if user 202 conducts the transaction. In some cases, resource provider computer 206 may store validation identity token 220 received from access device 204 for the authentication process.

Access device 204 may conduct an authentication process to determine whether user 202 may be authenticated. In some embodiments, the authentication process may comprise comparing validation identity token 220 generated during the transaction with the enrolled validation identity token previously provided by user 202 (e.g., process 505 in FIG. 5). In some cases, access device 204 may determine a value associated with the difference (e.g., absolute value of the subtracted difference) between validation identity token 220 generated during the transaction and the enrolled validation identity token. In some embodiments, access device 204 may determine whether the value is within a threshold and if so, may authenticate user 202 based on validation identity token 220. The value associated with the difference may be represented in other suitable forms, such as the percent error between validation identity token 220 and the enrolled validation identity token.

At step 10, upon comparing validation identity token 220 and the enrolled validation identity token, access device 204 may authenticate user 202 and present a notification of completion of the transaction to user 202. For example, access device 204 may choose to complete the transaction upon determining that the difference between validation identity token 220 and the enrolled validation identity token is within a threshold. In some cases, access device 204 may show a notification of completion of the transaction on display 251 to indicate to user 202 that the transaction has been successfully completed. In some embodiments, a transaction amount associated with the transaction may be debited from the account of user 202 and user 202 may receive goods or services related to the transaction.

In some cases, at a later time (e.g., at the end of the day), a clearing and settlement process can occur between transport computer 208, processing network 210, and authorization computer 212.

While an embodiment in which the identification data included in the request message sent to remote server computers (e.g., transport computer 208, processing network 210, and authorization computer 212) comprises validation identity token precursor 215 is described above, embodiments are not so limited. For example, the identification data included in the request message may not include validation identity token precursor 215 and instead may include other information that can help identity user 202. Thus, user 202 may provide other identification data (e.g., driver's license number, PAN, a phone number, an email address, etc.) during the transaction that may previously have been stored by the remote server computers during the enrollment process. When the remote computers receive the request message, they may match this other information to their previously stored data related to user 202, and retrieve appropriate information (e.g., validation keys, account information, etc.) to be utilized for the transaction.

In cases in which validation identity token precursor 215 is not included in the request message sent during the transaction, validation identity token 220 may be generated in different ways. In some cases, even though validation identity token precursor 215 may be not sent to other remote server computers in the request message, it may still be generated and stored (e.g., by resource provider computer 206) at the time of the transaction and utilized to form at least a part of validation identity token 220. In this case, validation identity token 220 may be generated utilizing validation identity token precursor 215, which may be stored at resource provider computer 206 but not sent in the request message, and the validation keys 225, 235, and 245 in a similar manner to that described above. To authenticate validation identity token 220, it may be compared with an enrolled validation identity token, which may be generated using an enrolled validation identity token precursor and validation keys 225, 235, and 245 during the enrollment process. If the difference between the generated validation identity token 220 and enrolled validation identity token is within a threshold, user 202 may be authenticated for the transaction.

In other cases, validation identity token precursor 215 may not be generated during the transaction. In such cases, validation identity token 220 may be generated utilizing the validation keys 225, 235, and 245. To authenticate validation identity token 220, it may be compared with an enrolled validation identity token, which may be generated using the validation keys 225, 235, and 245 during the enrollment process. If the difference between the generated validation identity token 220 and enrolled validation identity token is within a threshold, user 202 may be authenticated for the transaction.

While embodiments in which an enrollment process is conducted by user 202 with access device 204 or resource provider computer 206 associated with access device 204 are described above, embodiments are not so limited. For example, the embodiments described above may still be performed when user 202 conducts the enrollment process with another entity (e.g., remote server computer), such as processing network 210.

One embodiment that is simplified to enable an efficient transaction, in which the enrollment process may be conducted with processing network 210, is described below with respect to FIG. 2 and FIG. 6. In this embodiment, processing network 210 may not generate an enrolled validation identity token precursor.

The enrollment process that may be conducted by processing network 210 is described. User 202 may provide processing network 210 with enrollment data, including identification data, over a communications network. For example, user 202 may access a website or application hosted by processing network 210 on their user device to conduct the enrollment process. In some cases, user 202 may provide biometric information, such as by taking a picture of their face with their user device and sending the picture to processing network 210. Additionally, user 202 may enter any other enrollment data (e.g., PAN, email address, etc.) that may be utilized to identify user 202 or conduct a transaction into their user device and send the other enrollment data over the communications network.

Processing network 210 may then process the enrollment data including identification data. First, processing network 210 may generate validation keys 225, 235, and 245 based on identification data of the user (e.g., process 601 in FIG. 6). In an exemplary case, each validation key may comprise digital data associated with one section of the picture of the face of user 202 provided during the enrollment process. Processing network 210 may then distribute the validation keys to various remote entities, such as validation key 225 to transport computer 208 and validation key 245 to authorization computer 212. Processing network 210 may distribute the validation keys with identification data. The remote entities may store the received validation key in association with the identification data (e.g., driver's license number, PAN, email address, etc.) so that the validation can be received during a later transaction conducted by user 202.

Processing network 210 and the resource providing entity associated with access device 204 may have a previous agreement on how to generate a validation identity token using validation keys. In some cases, the agreement may indicate that the validation keys may be joined in such a way that the combination may generate the picture of the face of user 202 provided by user 202 during enrollment. It is then expected that the image associated with validation identity token 220, which may be generated by access device 204 during a future transaction, may match up to the face of user 202.

At a later time, user 202 may conduct a transaction using access device 204. User 202 may provide identification data (e.g., driver's license number, PAN, etc.) that may enable other entities to identify that user 202 is conducting the transaction. In this embodiment, user 202 may not need access device 204 to take an image of their face during the transaction. Access device 204 may include the identification data in the request message sent to the remote server computers. As described in the flow above, validation keys 225, 235, and 245 may be retrieved by remote server computers based on the associated identification data and returned to access device 204 in a response message.

Figure 6:
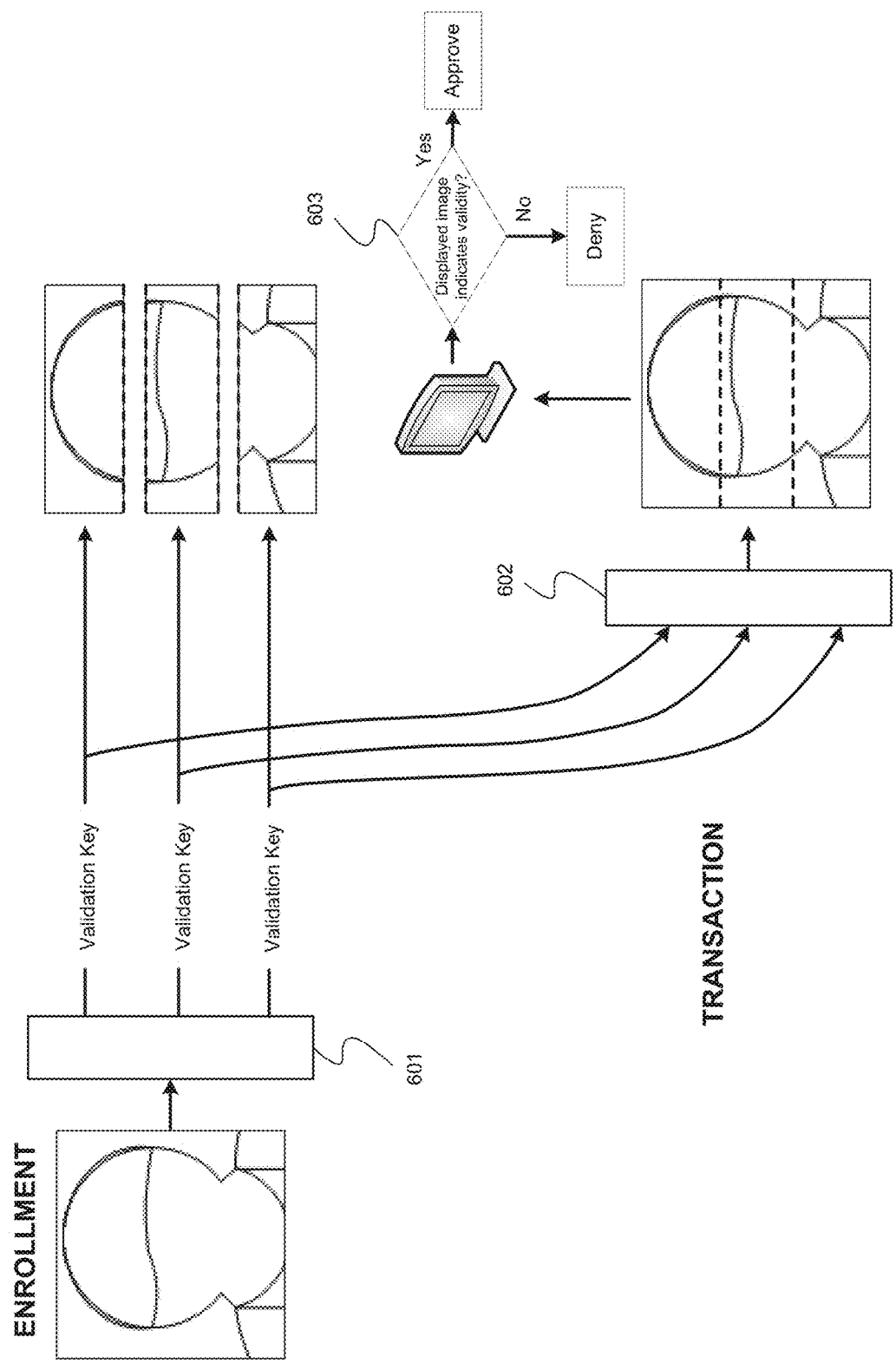
FIG. 6 shows a flow diagram for processing a validation identity token according to embodiments of the invention.

Access device 204 may then generate validation identity token 220 by combining the validation keys 225, 235, and 245 in the method agreed upon with processing network 210 during enrollment (e.g., process 602 in FIG. 6). For example, access device 204 may combine the validation keys such that validation key 225 is the digital data corresponding to the top third of the image, validation key 235 is digital data corresponding to the middle third of the image, and validation key 245 is the digital data corresponding to the bottom third of the image. In some cases, the digital data may be in the form of image matrices including data corresponding to a certain portion of the image.

Access device 204 may then display the generated validation identity token 220 as an image for authentication of user 202 (e.g., process 603 in FIG. 6). If validation identity token 220 is valid, the image displayed by access device 204 may match the facial image provided by user 202 during the enrollment process with processing network 210. This may allow a person overseeing the transaction, such as a cashier, to visually check whether user 202 looks like the individual shown in the image displayed by access device 204. If the cashier determines that user 202 is the individual shown in the image, user 202 may be authenticated for the transaction and the transaction may be completed.

In some embodiments, to forgo the step of the cashier performing the validity check of validation identity token 220, access device 204 may conduct the validity check. For example, user 202 may allow access device 204 to take an image of their face during the transaction, which access device 204 may compare to the image generated based on validation identity token 220. In some embodiments, the comparison may comprise a simple subtraction of the foreground (e.g., face of user 202) of the two images. In other embodiments, the comparison may utilize facial recognition technology, such as comparing the shape of the face and distance ratios of parts on the face (e.g., eyes, nose, mouth, chin, etc.) in both images to determine whether user 202 is likely the individual shown in the image generated based on validation identity token 220.

While the embodiments described above describe validation identity token 220 being generated near the end of the processing of the transaction, embodiments are not so limited. For example, validation identity token 220 may be generated at any suitable earlier stage of transaction processing (e.g., at authorization computer 212, processing network 210, and transport computer 208). The generated validation identity token 220 may be sent to resource provider computer 206 and access device 204, which may determine whether the transaction is valid based on validation identity token 220. Additionally, in some cases, multiple entities may generate validation identity token 220.

For example, in some cases, authorization computer 212 can construct validation identity token 220 after receiving the request message. This may be possible because it has the validation identity token precursor 215, as well as the validation keys 225, 235, 245. The authorization computer 212 may link the validation identity token precursor 215 to an account number (if the account number was not transmitted in the request message). Positive verification of the constructed validation identity token 220, based on the enrolled validation identity token 220 provided to authorization computer 212 during enrollment, may prove to the authorizing entity operating the authorization computer 212 that the user conducting the transaction is in fact authentic. Authorization computer 212 may then authorize the transaction based upon the account number linked to the validation identity token 220. In other embodiments, if the account number is present in the request message, then the constructed validation identity token 220 may serve as purely an authentication mechanism. In some cases, the response message generated by authorization computer 212 may include a check on whether or not the proper validation identity token was constructed.

Another embodiment of the transaction is described with respect to FIG. 2. Some steps may be described with respect to components of FIG. 7. An enrollment process and a transaction conducted by user 202 may follow a similar flow to embodiments described above. However, the validation identity token 220 may be a chromatic identity token, validation identity token precursor 215 may be a chromatic identity token precursor, and validation keys 225, 235, and 245 may be chromatic keys. The chromatic identity token, the chromatic identity token precursor, and the chromatic keys may be any suitable numerical values that represent colors, such as a 24-bit color representation in RGB color space (e.g., #FF0000 representing red, #00FF00 representing green, #0000FF representing blue).

While use of one exemplary color representation is described in embodiments described herein, it is understood that any suitable color representation may be utilized. For example, the color representation may utilize any appropriate number of bits (e.g., 8-bit, 6-bit, 24-bit, 36-bit, etc.) in any suitable color space (e.g., red-green-blue (RGB), cyan-magenta-yellow-key (CMYK), hue-saturation-value (HSV), etc.). Additionally, the color representations may be expressed using any suitable numerical representations (e.g., decimal, binary, hexadecimal, etc.).

In some embodiments, access device 204 may generate multiple pieces of information based on identification data provided by user 202 during the enrollment process. For example, access device 204 may generate an enrolled chromatic identity token precursor and chromatic keys (e.g., process 701 of FIG. 7). The chromatic keys may be distributed to remote server computers (e.g., transport computer 208, processing network 210, authorization computer 212), such that no single server computer receives all the chromatic keys. The chromatic identity token precursor and chromatic keys may be generated in a manner similar to that described above for the enrolled validation identity token precursor and validation keys, respectively.

However, an additional step may be performed, such that resulting values may be further mapped to a numerical value representing a color. For example, generating the enrolled chromatic identity token precursor may comprise calculating a validation identity token precursor as described above and then mapping the resulting value to a certain 24-bit color representation in the RGB color space. Similarly, the chromatic keys may be mapped to a certain 24-bit color representation in the RGB color space. The enrolled chromatic identity token precursor and chromatic keys may be mapped to any suitable color, as long as the enrolled chromatic identity token generated using enrolled chromatic identity token precursor and chromatic keys may result in a baseline authentication value (see below).

Access device 204 may generate a chromatic identity token during the enrollment process. This may also be known as the enrolled chromatic identity token. The enrolled chromatic identity token may be generated using the enrolled chromatic identity token precursor and chromatic keys (e.g., process 702 in FIG. 7). The enrolled chromatic identity token may be generated such that is corresponds to a baseline authentication value indicating that the transaction is valid. In some cases, this baseline authentication value may be associated with the color green (e.g., #00FF00 in RGB color space). Any chromatic identity token that is generated for a future transaction by user 202 that deviates from the baseline authentication value, and thus corresponds to a different color, may indicate that user 202 should not be authenticated.

Any combination of suitable operations may be utilized to combine the enrolled chromatic identity token precursor and chromatic keys, such that the enrolled chromatic identity token results in the baseline authentication value. In one example, the enrolled chromatic identity token precursor and the three chromatic keys may be mapped to hexadecimal values such that the hexadecimal values sum to a hexadecimal value #00FF00 representing green (e.g., each chromatic key is #002200, and enrolled chromatic identity token precursor is #009900). In another example, the enrolled chromatic identity token precursor and the three chromatic keys may be mapped to values that can be weighted by certain coefficients and summed to get hexadecimal value #00FF00 representing green (e.g., first chromatic key is #001100 with coefficient 2, second chromatic key is #001100 with coefficient 3, third chromatic key is #001100 with coefficient 4, and enrolled chromatic identity token precursor is #006600). In yet another example, the sum of the chromatic keys may be subtracted from the enrolled chromatic identity token precursor to get hexadecimal value #00FF00 representing green (e.g., each chromatic key is #550055, and enrolled chromatic identity token precursor is #FFFFFF). It is understood that the combinations of operations described above show specific examples, and hence additional and more complicated operations may be utilized to generate the enrolled chromatic identity token precursor.

User 202 may provide identification data to access device 204 when conducting the transaction. In some implementations, access device 204 may generate the chromatic identity token precursor based on the identification data provided by user 202 (e.g., process 703 in FIG. 7). The chromatic identity token precursor may be generated by access device 204 using the algorithm utilized to generate the enrolled chromatic identity token precursor during the enrollment process. Thus, it is expected that chromatic identity token precursor is the same or similar to the enrolled chromatic identity token precursor if user 202 conducts the transaction.

After receiving a response message for the transaction, access device 204 may generate the chromatic identity token. In some embodiments, the chromatic identity token may be generated utilizing the chromatic keys generated during enrollment and the chromatic identity token precursor (e.g., process 704 in FIG. 7). Access device 204 may generate the chromatic identity token using the algorithm utilized to generate the enrolled chromatic identity token during the enrollment process. Thus, it is expected that generated chromatic identity token is the same or similar to the enrolled chromatic identity token corresponding to the baseline authentication value if user 202 conducts the transaction.

Figure 7:
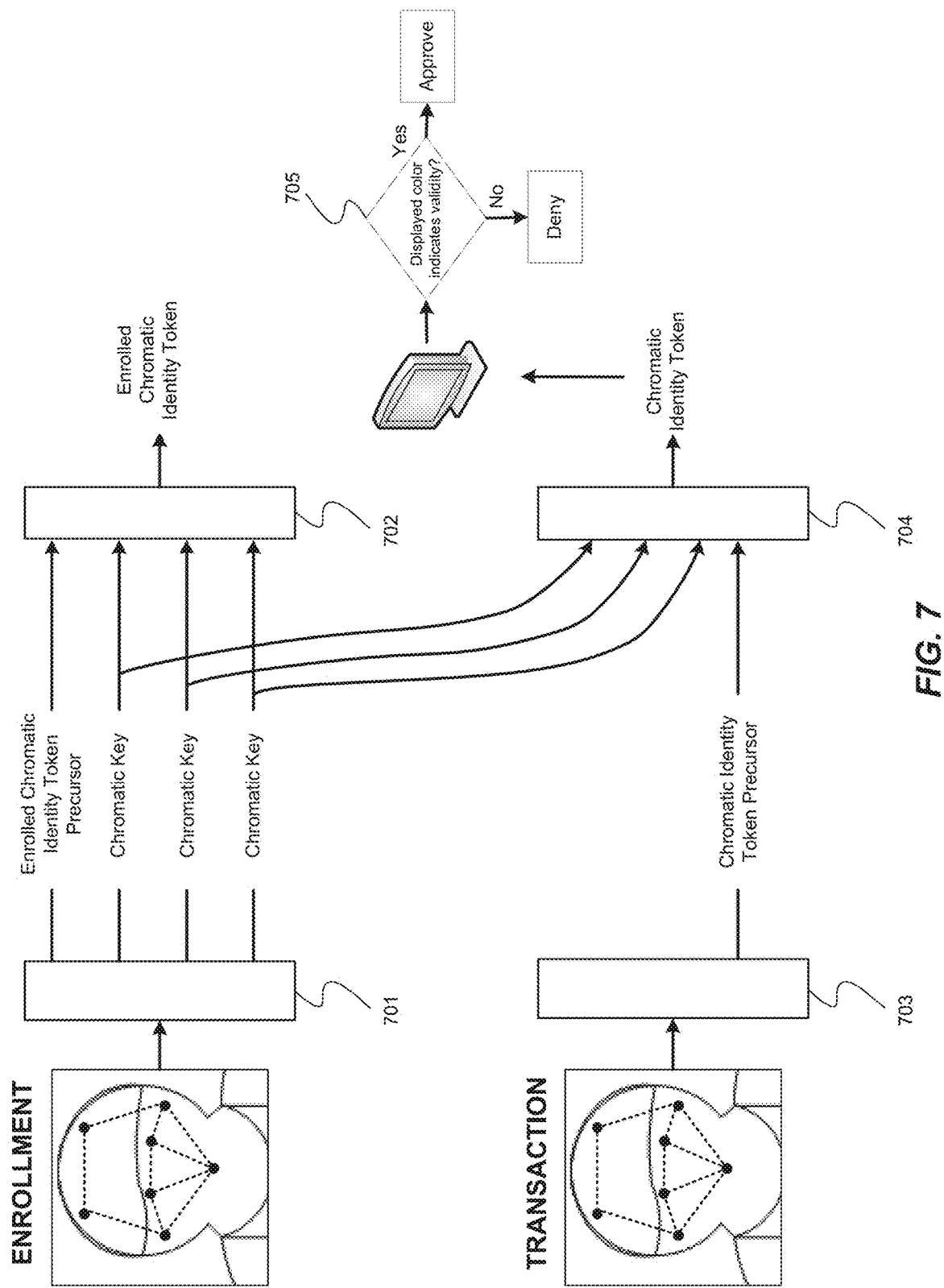
FIG. 7 shows a flow diagram for processing a chromatic identity token according to embodiments of the invention.

The generated chromatic identity token may be displayed and visually show the validity of the transaction (e.g., process 705 in FIG. 7). For example, access device 204 may display the color associated with the chromatic identity token to indicate to a person involved in the transaction (e.g., cashier, user 202) whether the transaction is valid. In some embodiments, the person may determine whether the transaction can be approved based on the displayed color associated with the chromatic identity token.

The chromatic identity token may indicate that the transaction is valid if the generated chromatic identity token is the same or within a threshold of the baseline authentication value (e.g., #00FF00 representing green) corresponding to the enrolled chromatic identity token. On the other hand, if the chromatic identity token deviates from the enrolled chromatic identity token by any amount, the generated chromatic identity token may not match the color associated with the baseline authentication value. In this case, the chromatic identity token may correspond to a different color than that associated with the baseline authentication value. For example, a slight deviation may result in the chromatic identity token corresponding to a different shade of green (e.g., #00AD00), a greater deviation may result in the chromatic identity token corresponding to a shade of orange (e.g., #FF9900), and an even greater deviation may result in the chromatic identity token corresponding to a shade of red (e.g., #FF0000).

Figure 8:
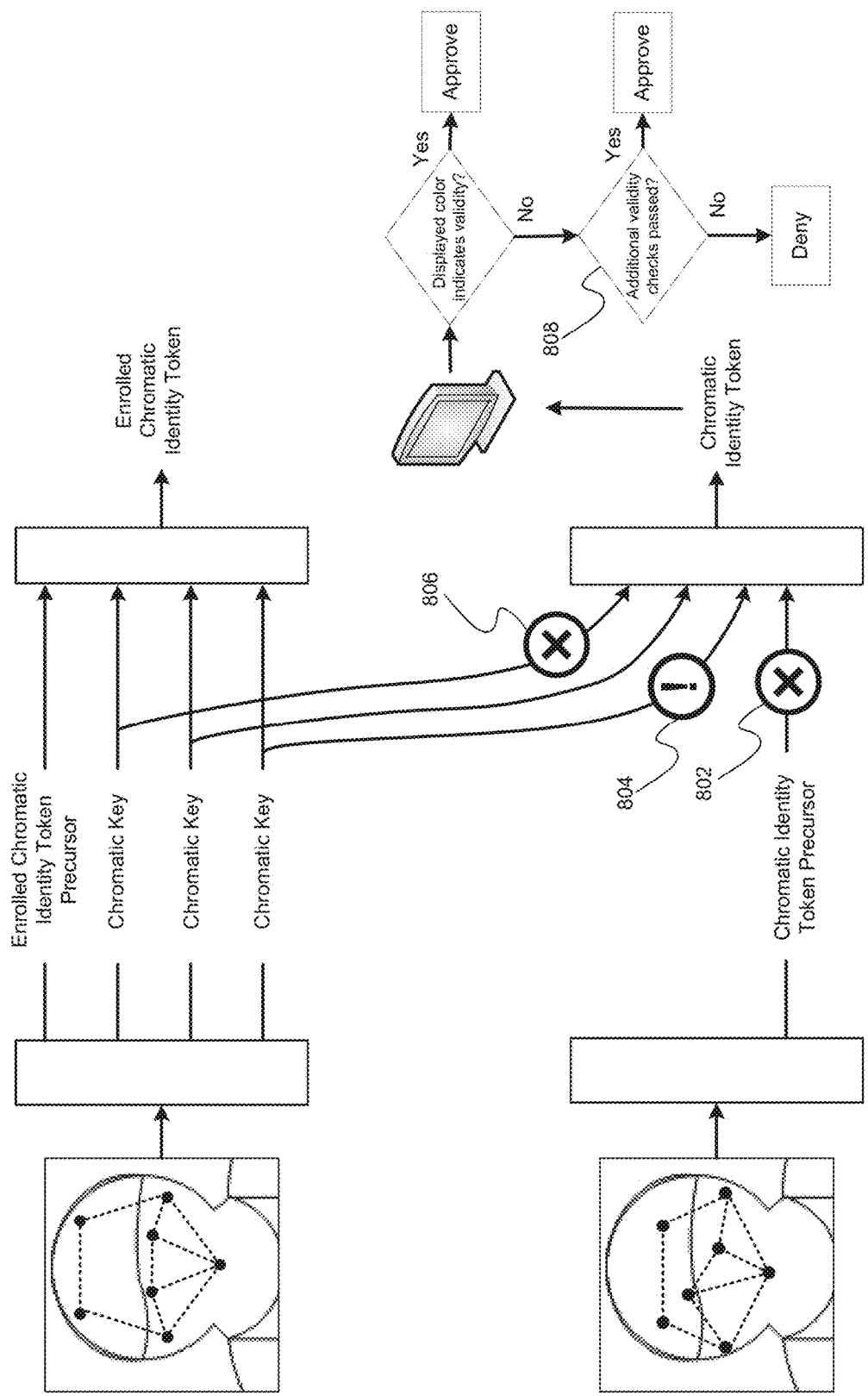
FIG. 8 shows a flow diagram for processing a chromatic identity token according to embodiments of the invention.

In some embodiments, the deviation of the chromatic identity token from the enrolled chromatic identity token may be caused by several factors. Some of these factors are described with respect to FIG. 8.

One factor may be that the chromatic identity token precursor deviates from the enrolled chromatic identity token precursor. As shown by 802, this may result in an inaccurate parameter utilized to generate the chromatic identity token. In some cases, the deviation of the chromatic identity token precursor may be small. This may indicate that user 202 is likely conducting the transaction and the deviation may be accounted for by a slight change in appearance of user 202 (e.g., different hairstyle, facial hair, makeup, etc.). In some cases, the deviation of the chromatic identity token precursor may be large. This may show that user 202 is not conducting the transaction and indicate that a potential fraudster may be conducting the transaction.

Another factor may be that a chromatic key deviates from the chromatic key originally stored in a remote server computer. As shown by 804, this may also result in an inaccurate parameter utilized to generate the chromatic identity token. In some cases, the deviation may be accounted for by flags or alerts issued by the remote server computer.

In one example, authorization computer 212 may conduct fraud analyses on the transaction and upon detecting potential fraud, may issue flags or alerts. In some embodiments, authorization computer 212 may send the flags or alerts within the response message to access device 204, which may account for them by changing the value (e.g., subtracting some value) of the relevant chromatic key before utilizing it as a parameter to generate the chromatic identity token. In some embodiments, authorization computer 212 may account for the flags or alerts by changing the value of the chromatic key included in the response message before sending it to access device 204. Certain types of flags or alerts may affect the value of the chromatic key more than others. For example, a flag that indicates that the transaction is being conducted in a region neighboring a local area typically associated with user 202 may result in a smaller deviation compared to an alert that indicates that the transaction amount is significantly greater than a typical transaction by user 202.

Another factor may be that a chromatic key was not appropriately received from a remote server computer. As shown by 806, this may also result in an inaccurate parameter utilized to generate the chromatic identity token. In some embodiments, a missing chromatic key may indicate that the request message for the transaction was not properly handled by a transaction entity. For example, if the chromatic key associated with transport computer 208 is missing, this may indicate that the request message did not travel through transport computer 208 or that transport computer 208 could not properly retrieve the chromatic key or process the request message.

Any of the factors described above may affect the resulting chromatic identity token. Thus, it may be up to the resource providing entity associated with access device 204 to determine for what values of the chromatic identity token the transaction may be approved. In some embodiments, if the chromatic identity token is displayed as a color and it is still not clear whether the transaction can be approved, addition validity checks may be performed, as shown in 808. For example, the resource providing entity may want to check the specific causes for the deviation of the chromatic identity token from the enrolled chromatic identity token. The reasons may include any combination of the factors described above. If the resource providing entity finds that the determined reasons do not likely indicate fraud, such as a slight deviation in the chromatic identity token precursor or a non-urgent alert issued by authorization computer 212, then the transaction may be approved. If the resource providing entity finds that the determined causes indicate high risk and potential fraudulent activity, such as a significantly different chromatic identity token precursor or an urgent alert issued by an authorization computer, then the transaction may be denied.

Embodiments of the invention may provide a number of advantages. Embodiments of the invention enable elements utilized to generate the validation identity token to not be stored by any one entity. For example, a validation identity token precursor may be provided by a user's presence at a POS terminal, while validation keys may be dispersed amongst several remote server computers (e.g., transport computer, processing network, and authorization computer). Since no single server computer may have possession of all elements to generate a complete validation identity token, the risk of the whole token being intercepted by an intermediary is mitigated.

Additionally, the resulting validation identity token can indicate the authenticity of the source and path associated with the validation identity token. For example, the validation identity token may deviate from the enrolled validation identity token if the source, the identity of the user conducting the transaction, is inaccurate. This is because the validation identity token may be generated based on identification data (e.g., biometric data) of the user. Additionally, the validation identity token may deviate significantly from the enrolled validation identity token if any part of the path, including entities (e.g., remote server computers) handling processing for the transaction, is dysfunctional for any reason. This is because the validation identity token may be generated based on validation keys, which may be distributed amongst the entities. The validation identity token may provide a way to effectively determine the validity of the transaction and provide additional insight into specific reasons as to why the transaction may not be valid.

The use of a chromatic identity token, a type of validation identity token, may also provide advantages. The chromatic identity token can visually indicate the authenticity of the source and path associated with the chromatic identity token. This may enable an efficient and intuitive way to recognize the validity of the transaction. Additionally, a resource provider may not have to follow predefined rules regarding what value of the chromatic identity token a corresponding transaction should be approved or denied.

Instead, an individual associated with the resource provider (e.g., cashier) may decide on a case-by-case basis whether additional validity checks should be performed for the transaction before approving or denying the transaction. For example, the cashier may see the color associated with the chromatic identity token, decide to conduct additional validity checks, and determine that the deviation of the chromatic identity token from a valid color (e.g., green) may be due to insignificant reasons (e.g., non-urgent flag issued by a remote server computer). This may enable fraudulent transactions to be more effectively distinguished from non-fraudulent transactions, which can forgo the use of processing power and resources for reprocessing transactions that are unnecessarily declined.

Embodiments of this invention further provide an efficient method of carrying out a transaction. For example, in some embodiments, a transaction may be conducted without use of a payment device. This is convenient as a user does not have to spend time handling their payment device during the transaction (e.g., taking card out of wallet, swiping card at access device, etc.). However, it is understood that embodiments of the invention can still be utilized for transaction utilizing payment devices.

Accordingly, embodiments of the invention provide an efficient and secure method of conducting a transaction. The use of the validation identity token allows for quick and easy detection of the state of the transaction without compromising security by mitigating risk. Further, the validation identity token enables authenticity of the source and path of the transaction to be monitored, which can provide insight as to specific reasons for which a transaction may be considered at risk.

Mitigating risk by separating components of a token amongst multiple entities can be applied outside of financial transaction contexts as well. For example, a general data transaction may similarly comprise certain data elements divided amongst multiple entities, wherein all the elements are necessary to view the data sent in the transaction. An exemplary situation is described in FIG. 9.

Figure 9:
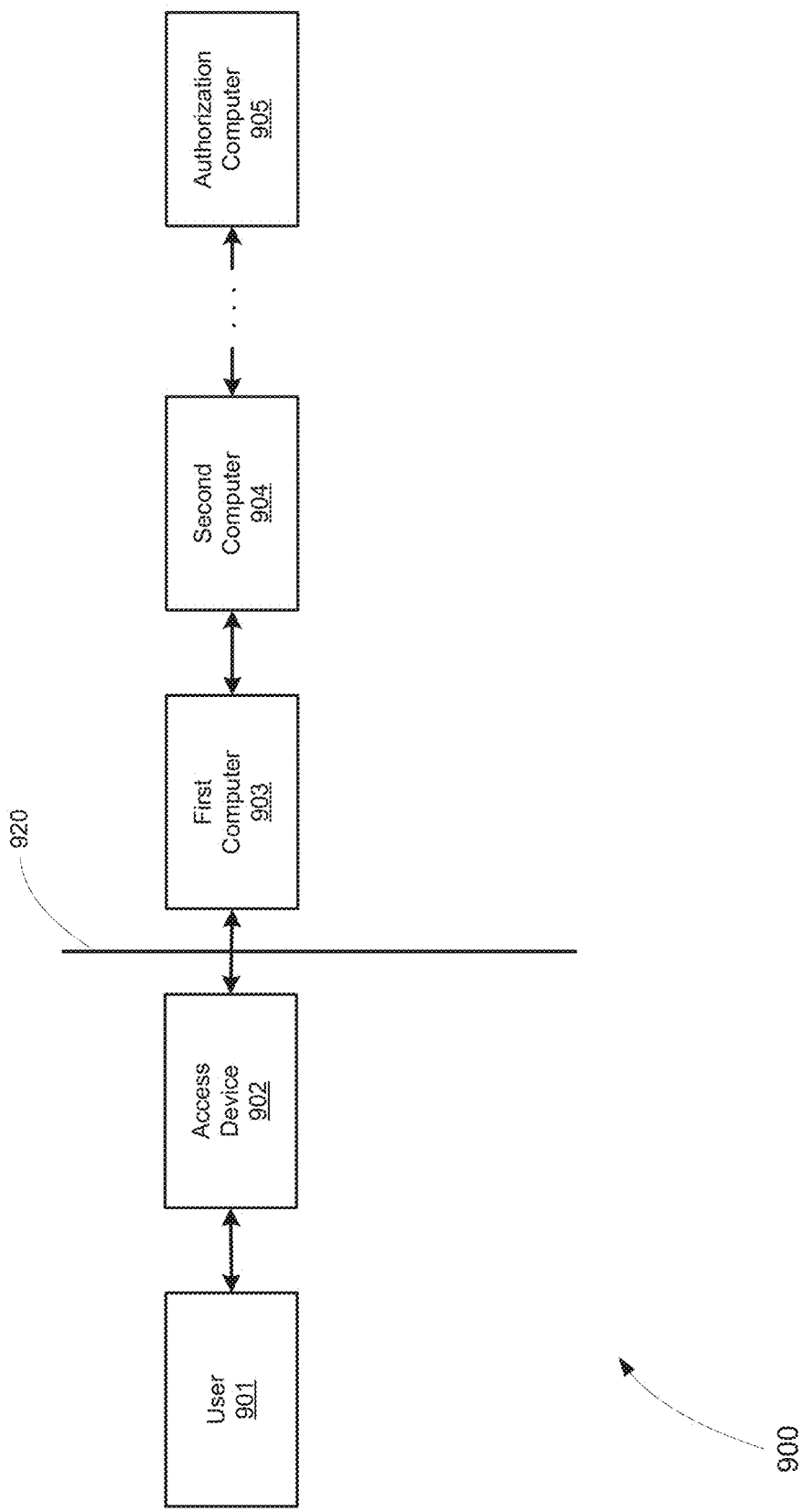
FIG. 9 shows a block diagram of an exemplary system according to embodiments of the invention.

FIG. 9 shows an exemplary block diagram 900 of a system according to embodiments of the invention. FIG. 9 may include a user 901, an access device 902, and a number of remote server computers including a first computer 903, a second computer 904, and an authorization computer 905. As shown, any suitable number of remote server computers may exist between second computer 904 and authorization computer 905. User 901 may conduct a transaction with a resource providing entity associated with access device 902 in order to gain access to resource 920.

Resource 920 may be in various forms. In one exemplary case, resource 920 may be an electronic resource (e.g., electronic document). In another exemplary case, resource 920 may be a physical building. In yet another exemplary case, resource 920 may be a service.

The remote server computers may be associated with any entities that have interest in authenticating user 902. For example, resource 920 may be associated with multiple owners (e.g., one or more editors and a publisher of an electronic document) that may want to take part in authenticating user 902 for the transaction. Accordingly, each remote server computer may be associated an owner entity.

Prior to the transaction, user 901 may enroll with the resource providing entity. In some embodiments, the enrollment process may be conducted immediately before the transaction. In other embodiments, the enrollment process may be conducted a longer time period (e.g., several months) prior to the transaction. During the enrollment process, user 901 may provide identification data to access device 902. For example, the identification data may be an iris scan of the eye of user 901 and any additional information (e.g., name, email address, etc.) that may be utilized to identify user 901.

Access device 902 may generate several pieces of information. In some embodiments, access device 902 may generate and store a validation identity token precursor based on identification data of user 901. This may also be known as the enrolled validation identity token precursor. Access device 902 may also generate validation keys based on the identification data and may distribute the validation keys to the remote server computers, such as first computer 903, second computer 904, authorization computer 905, and any additional computers that may exist between second computer 904 and authorization computer 905. In some cases, access device 902 may send certain identification data of user 901 received during enrollment, so that the remote server computers may store the validation key in association with the identification data.

Any distribution of validation keys may be utilized. In some embodiments, a single remote computer may receive multiple validation keys and certain remote computers may not receive any validation keys. However, the validation keys may be distributed such that no single remote computer may store all of the validation keys. Access device 902 may utilize the distributed validation keys and enrolled validation identity token precursor to generate a validation identity token indicating validity of a transaction.

User 901 may conduct the transaction. In some embodiments, user 901 may provide identification data to access device 902. For example, user 901 may allow access device 902 to collect an iris scan of their eye. In some cases, user 901 may also provide additional identification data (e.g., name, email address, etc.) that may help the resource provider and remote server computers identify user 901. Access device 902 may generate and store a validation identity token precursor based on the iris scan performed during the transaction. Access device 902 may generate a request message that may travel through the remote server computers.

During the transaction, the remote server computers may retrieve their respective validation keys. For example, first computer 903 may retrieve a validation key associated with user 901 stored during enrollment, second computer 904 may retrieve a validation key associated with user 901 stored during enrollment, and authorization computer 905 may retrieve a validation key associated with user 901 stored during enrollment. Any of the additional computers residing between second computer 904 and authorization computer 905 may also retrieve a validation key associated with user 901 stored during enrollment. The validation keys may be sent back to access device 902 in a response message generated by authorization computer 905, which may authorize the transaction.

Access device 902 may generate a validation identity token using the validation keys in the response message and stored validation identity token precursor. If the generated validation identity token matches or is within a threshold of the validation identity token generated during enrollment, the transaction may be approved and user 901 may receive access to resource 920.

As shown, embodiments of the invention may be applied to any general data transaction. The risk of the validation identity token being stolen by an intermediary can be mitigated, since portions of the validation identity token are distributed to several remote server computers. It is understood that any of the various embodiments described herein related to financial transactions may be applied to a general data transaction.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by an access device during an enrollment process, first identification data of a user, the first identification data comprising biometric information;
   generating, by the access device, a first validation identity token from the first identification data;
   storing, by the access device, the first validation identity token in a database;
   receiving, by the access device during a payment transaction, second identification data of the user, the second identification data comprising biometric information;
   generating, by the access device, a validation identity token precursor from the second identification data;
   generating, by the access device, an authorization request message comprising the validation identity token precursor, a merchant identifier, and a transaction amount;
   transmitting, by the access device, the authorization request message comprising the validation identity token precursor, the merchant identifier and the transaction amount to an authorization computer via a transport computer and a processing network computer, wherein the transport computer, the processing network computer, and the authorization computer respectively store first, second, and third validation keys;
   receiving, by the access device, an authorization response message from the authorization computer via the transport computer and the processing network computer, the authorization response message comprising the first, second, and third validation keys;
   generating, by the access device, a second validation identity token using at least the first, second, and third validation keys and the validation identity token precursor;
   authenticating, by the access device, the user by comparing the stored first validation identity token to the second validation identity token, and determining, by the access device, that a difference between the first validation identity token and the second validation identity token is within a threshold; and
   based upon the authenticating by the access device, generating, by the access device, a notification that the payment transaction is completed.

2. The method of claim 1, wherein the validation identity token precursor is a chromatic identity token precursor, the first, second, and third validation keys are chromatic keys, and the second validation identity token is a chromatic identity token, wherein the chromatic identity token precursor, the chromatic keys, and the chromatic identity token each comprise a hexadecimal value, and the hexadecimal value of the chromatic identity token is associated with a color in an RGB color space.

3. A system comprising:
   an access device;
   a transport computer coupled to the access device;
   a processing network computer coupled to the transport computer;
   an authorization computer coupled to the processing network computer;
   one or more processors; and
   one or more non-transitory computer-readable media comprising code, executable by the processor, causing the one or more processors to perform steps comprising:
   receiving, during an enrollment process, first identification data of a user, the first identification data comprising biometric information;
   generating a first validation identity token from the first identification data;
   storing the first validation identity token in a database;
   receiving, during a payment transaction, second identification data of the user, the second identification data comprising biometric information;
   generating a validation identity token precursor from the second identification data;
   generating an authorization request message comprising the validation identity token precursor, a merchant identifier, and a transaction amount;
   transmitting the authorization request message comprising the validation identity token precursor, the merchant identifier and the transaction amount to the authorization computer via the transport computer and the processing network computer, wherein the transport computer, the processing network computer, and the authorization computer respectively store first, second, and third validation keys;
   receiving an authorization response message from the authorization computer via the transport computer and the processing network computer, the authorization response message comprising the first, second, and third validation keys;
   generating a second validation identity token using at least the first, second, and third validation keys and the validation identity token precursor;
   authenticating the user by comparing the stored first validation identity token to the second validation identity token, and determining that a difference between the first validation identity token and the second validation identity token is within a threshold; and
   based upon the authenticating, generating a notification that the payment transaction is completed.

4. The system of claim 3, wherein the validation identity token precursor is a chromatic identity token precursor, the first, second, and third validation keys are chromatic keys, and the second validation identity token is a chromatic identity token, wherein the chromatic identity token precursor, the chromatic keys, and the chromatic identity token each comprise a hexadecimal value, and the hexadecimal value of the chromatic identity token is associated with a color in an RGB color space.

5. The method of claim 1, wherein the first and second validation keys are collected by the authorization computer from the transport computer and the processing network computer as the authorization request message is transmitted from the access device.

6. The method of claim 1, wherein the authorization response message further comprises one or more error flags from the authorization computer and the method further comprises, after receiving the authorization response message:
    modifying, by the access device, one or more of the first, second, and third validation keys in response to the one or more error flags.

7. The system of claim 3, wherein the access device is a point of sale terminal.

8. The system of claim 3, wherein the authorization response message further comprises one or more error flags from the authorization computer and the steps further comprise, after receiving the authorization response message:
    modifying one or more of the first, second, and third validation keys in response to the one or more error flags.

9. The method of claim 1, wherein the access device is a point of sale terminal, the authorization computer is an issuer computer, and the authorization request message and the authorization response message are in an ISO 8583 message format.

10. The method of claim 2, wherein the biometric information of the user is a facial image of the user.

11. The method of claim 1, wherein the authorization request message further comprises a primary account number associated with an account that is used to conduct the payment transaction.

12. The method of claim 11, wherein the authorization response message comprises fraud information from the authorization computer.

13. The method of claim 12, further comprising:
    storing, by the access device, the primary account number along with the first validation identity token in the database.

14. The method of claim 1, wherein the method further comprises, before receiving the authorization response message from the authorization computer:
    receiving, by the processing network computer from the authorization computer, the authorization response message with the third validation key; and
    inserting, by the processing network computer, the second validation key into the authorization response message.

15. The method of claim 14, further comprising:
    transmitting, by the processing network computer, the authorization response message with the second validation key and the third validation key to the transport computer.

16. The method of claim 15, further comprising:
    receiving, by the transport computer, the authorization response message comprising the second validation key and the third validation key;
    inserting, by the transport computer, the first validation key into the authorization response message; and
    transmitting, by the transport computer, the authorization response message comprising the first, second, and third validation keys to the access device.

17. The method of claim 16, wherein the access device is a point of sale terminal.

18. The method of claim 17, wherein the authorization request message further comprises an account number, which is a credit or debit card number associated with an account that is used to conduct the payment transaction.

19. The method of claim 18, further comprising:
    authorizing, by the authorizing computer, the authorization request message based upon the account number.

\* \* \* \* \*